United States Patent
Klecka et al.

(10) Patent No.: US 7,551,640 B1
(45) Date of Patent: Jun. 23, 2009

(54) METHOD AND APPARATUS FOR ERRORLESS FRAME TIMING ADJUSTMENT

(75) Inventors: Rudolph B Klecka, Dallas, TX (US); Douglas E. Duschatko, Austin, TX (US); Lane B. Quibodeaux, Allen, TX (US); David D. Wilson, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1030 days.

(21) Appl. No.: 10/251,641

(22) Filed: Sep. 20, 2002

(51) Int. Cl.
*H04J 3/16* (2006.01)
*H04J 3/22* (2006.01)

(52) U.S. Cl. .................................... 370/465

(58) Field of Classification Search ............ None
See application file for complete search history.

(56) References Cited

U.S. PATENT DOCUMENTS

| | | | |
|---|---|---|---|
| 4,807,230 A * | 2/1989 | Srinivasagopalan et al. | 714/789 |
| 5,127,023 A * | 6/1992 | Tash et al. | 375/282 |
| 5,359,605 A * | 10/1994 | Urbansky et al. | 370/366 |
| 5,627,863 A * | 5/1997 | Aslanis et al. | 375/357 |
| 5,724,352 A * | 3/1998 | Cloonan et al. | 370/388 |
| 5,917,815 A * | 6/1999 | Byers et al. | 370/352 |
| 5,933,468 A * | 8/1999 | Kingdon | 375/362 |
| 6,336,192 B1 * | 1/2002 | Sakamoto et al. | 713/503 |
| 6,636,832 B1 * | 10/2003 | Li | 704/500 |
| 6,873,621 B2 * | 3/2005 | Kamoi et al. | 370/395.61 |
| 6,888,826 B1 * | 5/2005 | Martin et al. | 370/359 |
| 6,934,305 B1 | 8/2005 | Duschatko et al. | |
| 6,982,974 B1 | 1/2006 | Saleh et al. | |

FOREIGN PATENT DOCUMENTS

WO WO 98/39865 * 9/1998

* cited by examiner

*Primary Examiner*—Ayaz R Sheikh
*Assistant Examiner*—Blanche Wong
(74) *Attorney, Agent, or Firm*—Samuel G. Campbell, III; Campbell Stephenson LLP

(57) ABSTRACT

A frame timing adjustment apparatus is disclosed. The apparatus includes an ingress framing unit, an egress framing unit coupled to the ingress framing unit, and a framing control unit coupled to control the ingress framing unit and the egress framing unit. The ingress framing unit is configured to generate an adjusted frame by virtue of being configured to adjust a position of information within a frame. The egress framing unit is configured to frame on the adjusted frame. The framing control unit is coupled to control the ingress framing unit to generate the adjusted frame and the egress framing unit to frame the adjusted frame.

35 Claims, 16 Drawing Sheets

Key To

| | | | |
|---|---|---|---|
| A1 802 | A2 804 | J0 Z0 806 | Payload Bytes 890 |
| B1 810 | E1 812 | F1 814 | Payload Bytes 891 |
| D1 820 | D2 822 | D3 824 | Payload Bytes 892 |
| H1 830 | H2 832 | H3 834 | H4 836 Payload Bytes 893 |
| B2 840 | K1 842 | K2 844 | Payload Bytes 894 |
| D4 850 | D5 851 | D6 852 | Payload Bytes 895 |
| D7 853 | D8 854 | D9 855 | Payload Bytes 896 |
| D10 856 | D11 857 | D12 858 | Payload Bytes 897 |
| S1 Z1 870 | M1 Z2 872 | E2 874 | Payload Bytes 898 |

SONET Frame 800

*FIG. 8*
(Prior Art)

Key To

| FIG. 10A |
| FIG. 10B |

METHOD AND APPARATUS FOR ERRORLESS FRAME TIMING ADJUSTMENT

BACKGROUND OF THE INVENTION

1. Field of the Invention

This invention relates to the field of information networks, and more particularly relates to switching matrices used in routing information through such information networks.

2. Description of the Related Art

Today's networks carry vast amounts of information. High bandwidth applications supported by these networks include streaming video, streaming audio, and large aggregations of voice traffic. In the future, these bandwidth demands are certain to increase. Many modern networking topologies thus employ high speed transport of some kind to achieve the performance necessary to support such applications. Moreover, this information must be quickly and efficiently distributed to various destinations without the introduction of errors.

Several solutions for transporting such data streams exist, a number of which employ synchronous techniques (the Synchronous Optical NETwork (SONET) standard). Given that such techniques are synchronous, by their very nature, they require some level of synchronization of data signals to a clock. This is complicated by the fact that local clocks may vary from one system to another. To address this need, clock recovery circuits are employed within receivers in such systems to establish synchronization between a locally generated clock and the timing of a data stream within a received data signal. The incoming data stream is synchronized to the local clock by recovering the data stream's clock, which can then be used to control recovery of the data. A phase-locked loop (PLL) circuit is often used to provide such clock recovery.

As noted, the incoming data stream in synchronous systems is often not actually synchronous (i.e., having the same frequency and phase) with the local clock. Typically, the data stream's "clock" and the local clock will either be slightly out of phase (referred to as mesosynchronous or mesochronous, meaning that the two signals corresponding significant instants occur at the same average rate (i.e., that their frequencies are, on average, the same)), or slightly out of phase and/or slightly off-frequency (referred to as plesiosynchronous).

The need for synchronous signals mandates systems that are capable of accepting mesochronous datastreams (mesochronous with each other and with the system clock of the receiving system). There is therefore the need to be able to re-time these signals to the system clock of the receiving system, and often to one another. Additionally, it is desirable to provide the ability to tolerate clock failures (e.g., inaccuracy or loss of clock signal), without generating bit errors in the data stream.

SUMMARY OF THE INVENTION

According to one embodiment of the present invention, a frame timing adjustment apparatus is disclosed. The apparatus includes an ingress framing unit, an egress framing unit coupled to the ingress framing unit, and a framing control unit coupled to control the ingress framing unit and the egress framing unit. The ingress framing unit is configured to generate an adjusted frame by virtue of being configured to adjust a position of information within a frame. The egress framing unit is configured to frame on the adjusted frame. The framing control unit is coupled to control the ingress framing unit to generate the adjusted frame and the egress framing unit to frame the adjusted frame.

According to another embodiment of the present invention, a method of errorlessly adjusting frame timing is disclosed. The method includes adjusting a position of information within a frame to produce an adjusted frame, and framing the adjusted frame.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 8 illustrates a standard frame of the synchronous optical network protocol.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, in order to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Introduction

The present invention provides a method and apparatus for clearing loss-of-framing errors in a frame-based protocol without introducing errors in the affected data stream. By shifting the information carried in a given frame (e.g., overhead information, payload information and so on) to produce an adjusted frame, and accepting such adjusted frames as they proceed outbound (outbound frames (those being transmitted back into the network) having the information they carry thus shifted), a method and apparatus according to the present invention allow the frame's internal timing (i.e., layout) to be synchronized to other incoming data streams, other outgoing data streams, the given system's frame timing or other timing source. This can be accomplished, for example, by consuming extra byte (or bit) positions at the beginning (or end) of an inbound frame. Given that the payload is allowed to "float" within the system's frame, it is also possible to have inbound and outbound frames pleisiosynchronous with the system frame and/or each other, and still maintain proper operations of a system employing the present invention (e.g., in the case where a system's clock standard fails).

Such functionality can be achieved, for example, by shifting the frame boundary (and so all the information carried in the given frame) of an inbound pleisiosynchronous frame (a frame that is out-of-synchronization with another frame (e.g., the frame timing of another inbound frame, the system frame or an outbound frame)). On the outbound leg through the system, outbound framing is configured to lock onto the now-adjusted frame, despite the shift in that frame's frame boundary. This is in contrast to standard techniques, in which such changes in frame boundary timing causes the generation of errors, and the resulting loss of one or more frames.

EXAMPLE METHOD AND APPARATUS ACCORDING TO THE PRESENT INVENTION

Figure 1:
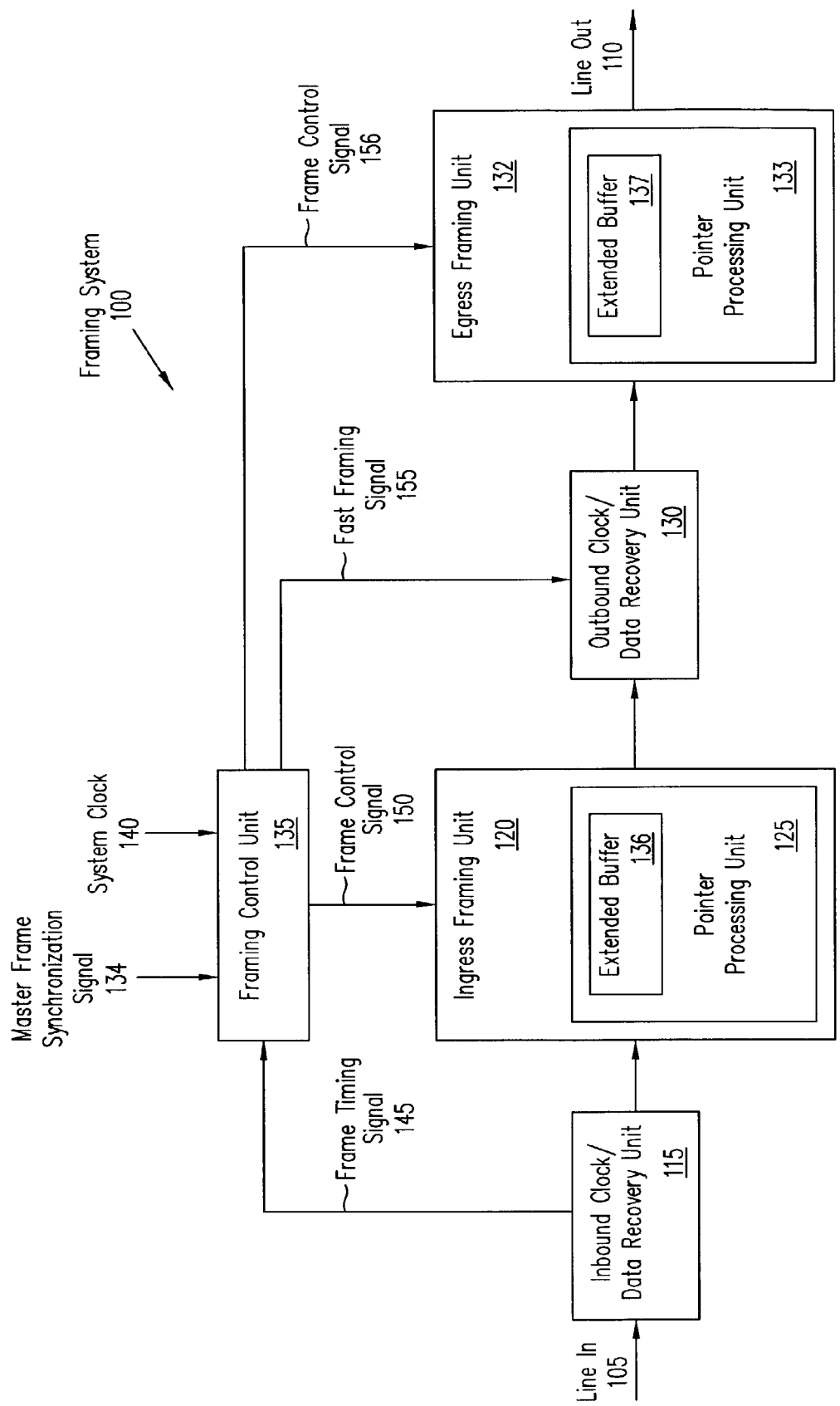
FIG. 1 is a block diagram of a framing system according to embodiments of the present invention.

FIG. 1 is a block diagram illustrating a framing system 100 capable of clearing loss-of-synchronous-frame-alignment (LOSFA) errors without causing bit-errors in the affected data stream(s). Framing system 100 receives an inbound data stream via a line in 105 and transmits that data stream on a line out 110. A data stream is received by an inbound clock/data recovery (CDR) unit 115 via line in 105. As described subsequently, a CDR recovers clock and data information from a serial bitstream by recovering the clocking signal from the incoming bitstream (e.g., using a phase-locked loop (PLL)), and then recovering the data using the clock thus recovered. Inbound clock/data recovery unit 115 supplies the recovered data stream to an ingress framing unit 120. Ingress framing unit 120 includes a pointer processing unit 125 which is configured to perform pointer processing according to embodiments of the present invention.

Once the position of the data stream's frame is properly adjusted by pointer processing unit 125, ingress framing unit 120 passes the data stream to outbound clock/data recovery unit 130. Outbound clock/data recovery unit 130 is configured to accept frames having A1-A2 transitions in any location within the frame, and so is able to acquire a lock on the incoming frame, despite the fact that the incoming frame may not have the nominal number and arrangement of framing bytes (e.g., A1-A2 bytes). Outbound clock/data recovery unit 130 supplies the recovered data stream to a second framing unit (an egress framing unit 132). Egress framing unit 132 is configured to accept frames having A1-A2 transitions in any location within the frame, and so is able to process frames that have had their A1-A2 transitions shifted from the usual position. This ability is provided by a pointer processing unit 133, which is configured to recognize the frame as altered by pointer processing unit 125 of framing unit 120.

A pointer processing unit such as pointer processing unit 125 is configured to shift a given frame by, for example, moving the frame boundary in response to adjustments made to a master frame synchronization signal 134 (also referred to as a master frame pulse) that is received by a framing control unit (depicted in FIG. 1 as a framing control unit 135) controlling framing unit 120 (and so pointer processing unit 125). These adjustments can be either forwards or backwards, depending on which direction is required, and, as noted, are used to adjust the signals generated by framing control unit 135.

An extended buffer 136 (i.e., a larger-than-normal buffer) in pointer processing unit 125 allows pointer processing unit 125 to "absorb" (cope with) the movement of the frame boundary without overflowing or underflowing. If an overflow or underflow condition is imminent, the appropriate pointer increment or decrement is performed. Further description of pointer incrementing and decrementing is given in patent application Ser. No. 09/477,166, filed Jan. 4, 2000 and entitled "METHOD AND APPARATUS FOR A REARRANGEABLY NON-BLOCKING SWITCHING MATRIX," as included by reference herein. Similarly, pointer processing unit 133 of egress framing unit 132 includes its own extended buffer (depicted in FIG. 1 as an extended buffer 137), which is also configured to handle movement of the frame boundary without experiencing an overflow or underflow condition.

Framing control unit 135 controls inbound clock/data recovery unit 115, framing unit 120 and outbound clock/data recovery unit 130. Framing control unit 135 receives a system clock 140 and a frame timing signal 145 (from inbound clock/data recovery unit 115). Framing control unit 135 generates a frame control signal 150 (which is provided to framing unit 120), a fast framing signal 155 (which is provided to outbound clock/data recovery unit 130) and a fast framing signal 156 (which is provided to framing unit 132). It will be noted that, unless framing system 100 is used solely for adjusting framing, system components will typically exist between the inbound CDR/framing units and the outbound CDR/framing units. For simplicity, such elements are not shown here (but do appear in the figures depicting various aspects of an example router, as described subsequently).

In operation, framing system 100 receives system clock 140 from the system in which framing system 100 exists, and receives frame timing signal 145 from inbound clock/data recovery unit 115 (indicating the frame timing of the incoming frame on line in 105). From system clock 140 and frame timing signal 145, framing control unit 135 generates frame control signal 150 and fast framing signal 155. Framing control unit 135 uses frame control signal 150 to indicate to framing unit 120 (and, in particular, to pointer processing unit 125) the manner in which the incoming frame's pointers should be adjusted to account for differences between the system clock 140 and that of the incoming frame, for example. This operation, as described in greater detail subsequently, alters the point at which the frame boundary occurs. In the case where such an adjustment is necessary, framing control unit 135 uses fast framing signal 155 to indicate to outbound clock/data recovery unit 130 and framing unit 132 that the adjusted frame should be accepted, despite the change in configuration of the frame. When fast framing signal 155 is asserted, outbound clock/data recovery unit 130 and framing unit 132 accept the adjusted frame even though one or more framing bytes have been added or deleted. In this manner, adjustments can be made to an incoming frame's timing without the loss of any of that frame's data. It will be noted that the ability to shift an ESF's payload within the ESF is made possible by the ability to move the frame boundary. Thus, if a higher bit rate is used internally to the system (i.e., the frequency of system clock 140 is higher than that of the incoming data stream, more "room" would exist in the ESF (i.e., a greater number of bit positions would exist in the ESF), and so a greater amount of shifting could be accommodated.

In this manner, framing system 100 provides a mechanism which errorlessly changes the frame alignment of a framed data stream (e.g., a SONET-SDH data stream). This mechanism provides a useful solution to, for example, the situation in which normally frame-aligned mesochronous data streams become mis-aligned to the system frame, for whatever reason, and require re-alignment to that system frame while avoiding the generation of bit errors in that data stream. As noted, the mechanism involves two framers, one framer on the ingress side of framing system 100 and one framer on the egress side of framing system 100. These framing units are represented in FIG. 1 by framing units 120 and 132, respectively. The ingress framer includes a pointer processor which allows for small frame movements referred to herein as incremental frame movements (IFMs). Such an ingress framing unit can employ a standard SONET-SDH pointer processor configured to provide the incremental frame movements described herein (e.g., pointer processing unit 125). On the egress side, outbound clock/data recovery (CDR) unit 130 and framing unit 132 provide a special "fast frame" feature, in the manner previously described. Such a fast frame feature is a mode into which the egress framer/CDR can be put to allow the egress framer to accept small movements (again, IFMs) in the A1-A2 frame boundary without "going out of frame" (i.e., generating loss-of-frame (LOSFA) errors). Such an egress framer is configured to detect the next A1-A2 boundary within a given range (i.e., the size of the IFM), and accepting the first such boundary encountered as an acceptable A1-A2 boundary for that frame. It will be noted that, by contrast, a standard SONET-SDH-compliant framer is configured to expect the next A1-A2 boundary at the same point at which the last boundary occurred in the previous frame, and to generate framing errors if the boundary is not at that point. If such framing errors are generated, such a standard SONET-SDH-compliant framer will not accept the new A1-A2 framing boundary until that boundary has occurred at the same point for several frames in a row (e.g., according to the GR-253 standard, with 4 frames out of synchronization and 2 frames in synchronization, for a total of 6 frame times from loss of synchronization (going "out-of-frame") to re-synchronization (returning to being "framed"), incurring the associated loss of data).

While in the fast frame mode, the egress framer should also be able to frame on the A1-A2 boundary with less than the full compliment of A1 bytes (which is not synonymous with the frame boundary occurring at the same point, because even though the latter were the case, the number of A1 bytes could still change (e.g., one or more A1 bytes being malformed)). As will be described in further detail subsequently, this is required because the IFM will typically cause some of the A1 bytes to be deleted (or, as referred to subsequently, "consumed"). For example, if the data stream were a SONET STS-48, there would be 48 A1 bytes (and 48 A2 bytes). If the egress framer required only the last twelve A1 bytes to be present for accurate framing operations to proceed, then a mechanism according to the present invention can be designed to move the frame pulse by up to thirty-six byte times per IFM. Ultimately, these IFMs are translated into pointer adjustments by the egress pointer processor. The egress pointer process preferably conforms to a standard pointer processing function such as that specified in the GR-253 standard referred to elsewhere herein. In particular, such a pointer processing function can conform to section 3.5 of that specification entitled "Pointer Processing". The egress pointer processor utilizes a floating payload concept with the ability to add or subtract data. The intent of such a pointer processor is to handle frequency and phase differences when the received data-stream is pleisiochronously timed to the egress time domain. If the frequency of the received data stream is less than the egress frequency, the egress pointer processor inserts a negative stuff byte (and so sends one less data byte during a frame) to compensate for the lack of data. Such an operation is referred to herein as a pointer decrement. In a similar fashion, when the frequency of the received data stream is greater than the egress frequency, an extra byte can be inserted into a given frame to compensate for the extra data. This operation is known as a pointer increment. The egress pointer processor is therefore used to absorb the data movements caused by the IFMs inserted by the ingress framing unit. The IFMs result in a data shift in the frame. This data shift is similar to the frequency of the received data stream being greater than that of the egress data stream. The pointer processor performing an increment operation handles the data movement caused by the IFM.

It will be noted that pointer adjustments (e.g., SONET-SDH pointer adjustments) are restricted by design to a maximum rate of change. Because the IFMs discussed herein are translated into pointer adjustments, the rate of the IFMs must be limited to less than the maximum allowed by the given standard employed (again, e.g., SONET-SDH). Therefore, to perform an errorless frame alignment, the rate at which IFMs can be performed must be calculated. This rate is calculated by dividing the maximum rate of change in frame location by the amount of time required by each IFM. This is described in further detail subsequently.

Figure 2:
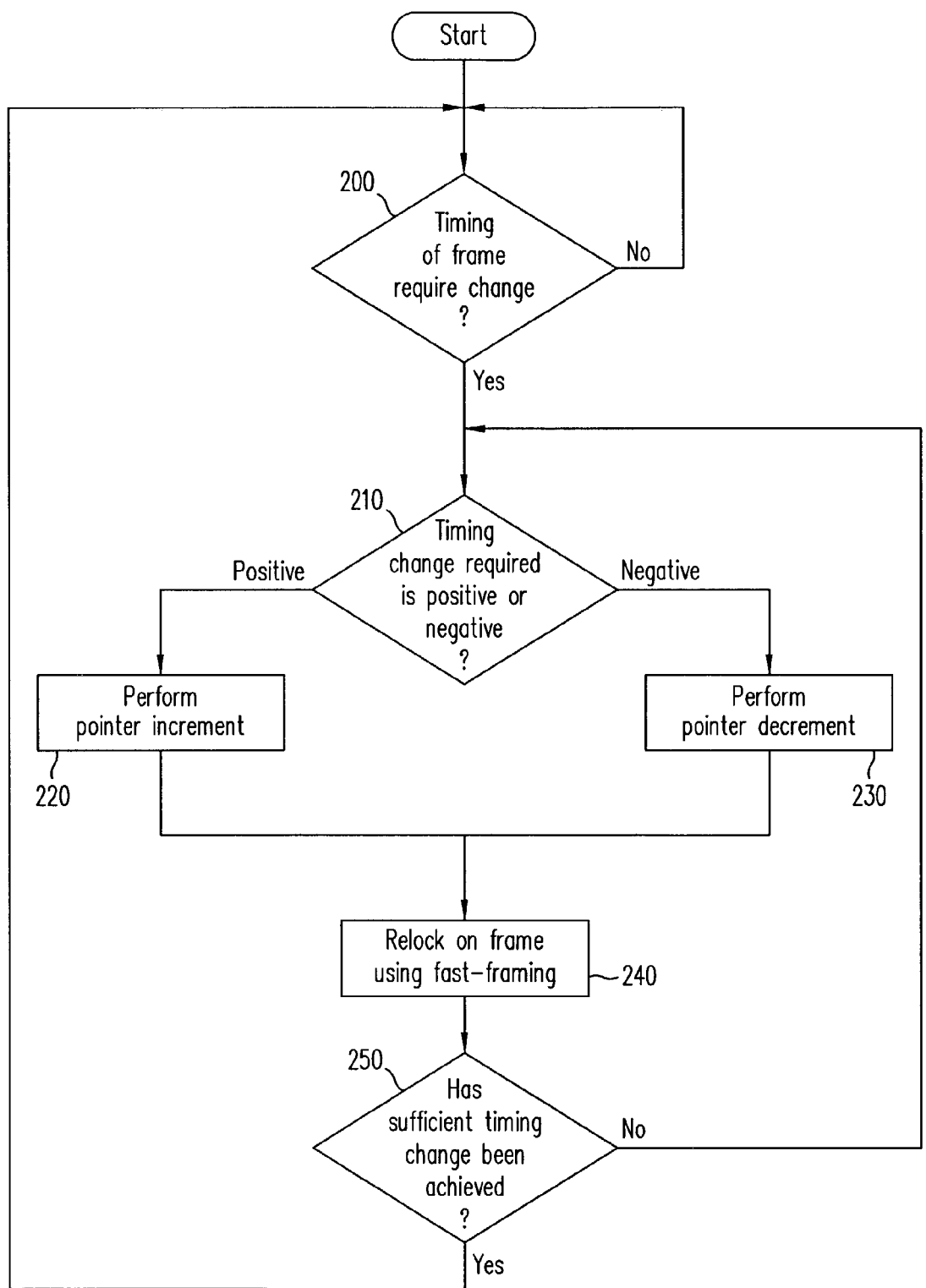
FIG. 2 is a flow diagram of a method of framing according to embodiments of the present invention.

FIG. 2 is a flow diagram illustrating a process of frame timing adjustment according to embodiments of the present invention. The process begins with the detection of the need for such a frame timing change (step 200). While no such change is necessary, the process loops, awaiting such a requirement. When a timing change is required, a determination is made as to whether the required timing change is positive or negative (step 210). If a positive pointer adjustment is required, a pointer increment is performed (step 220), while if a negative pointer adjustment is required, a pointer decrement is performed (step 230). Once the requisite pointer adjustment is made, the egress framing unit relocks on the adjusted frame using fast framing (step 240). A determination is then made as to whether frame timing has been adjusted sufficiently (step 250). If further IFMs are required, the process loops and performs further timing adjustments in the manner just described. Once the requisite timing adjustments have been made, the process loops back and awaits the need for further timing adjustments (step 200).

The foregoing describes a process for slowly moving a frame pulse associated with an incoming frame that allows an egress pointer processor to make pointer adjustments (e.g., within the limits set by the GR-253 standard). Such an technique can be implemented, for example, in software. Such software can be supported in hardware, for example, by the provision of two hardware registers; (1) a control register referred to herein as a "frame offset control" register (which is used to move the A1-A2 boundary out of the ingress pointer processor), and (2) a status register referred to herein as a "frame offset status" register (which such software uses to determine the discrepancy between the incoming frame and the position of the nominal frame pulse). Preferably, such software is designed to control the rate of IFMs such that the adjustments are compliant with applicable standards (e.g., the GR-253 standard). A frame mis-alignment error is detected by reading the frame offset status register and determining that the incoming frame's timing is outside of an acceptable range from a nominal timing, and so is mis-aligned. A determination is then made as to the total amount by which the frame is mis-aligned, and the number of IFMs required to "pull" the given frame back into a nominal timing range. IFMs are then generated at the rate determined to be acceptable, until the given frame is back within an acceptable range of nominal. The amount of time required to perform such re-alignment of the frame pulse depends upon two primary criteria; (1) the rate at which the IFMs are performed, and (2) the amount by which the frame pulse must be moved to get the frame pulse back into a nominal position.

AN EXEMPLARY NETWORK ELEMENT ACCORDING TO THE PRESENT INVENTION

Figure 3:
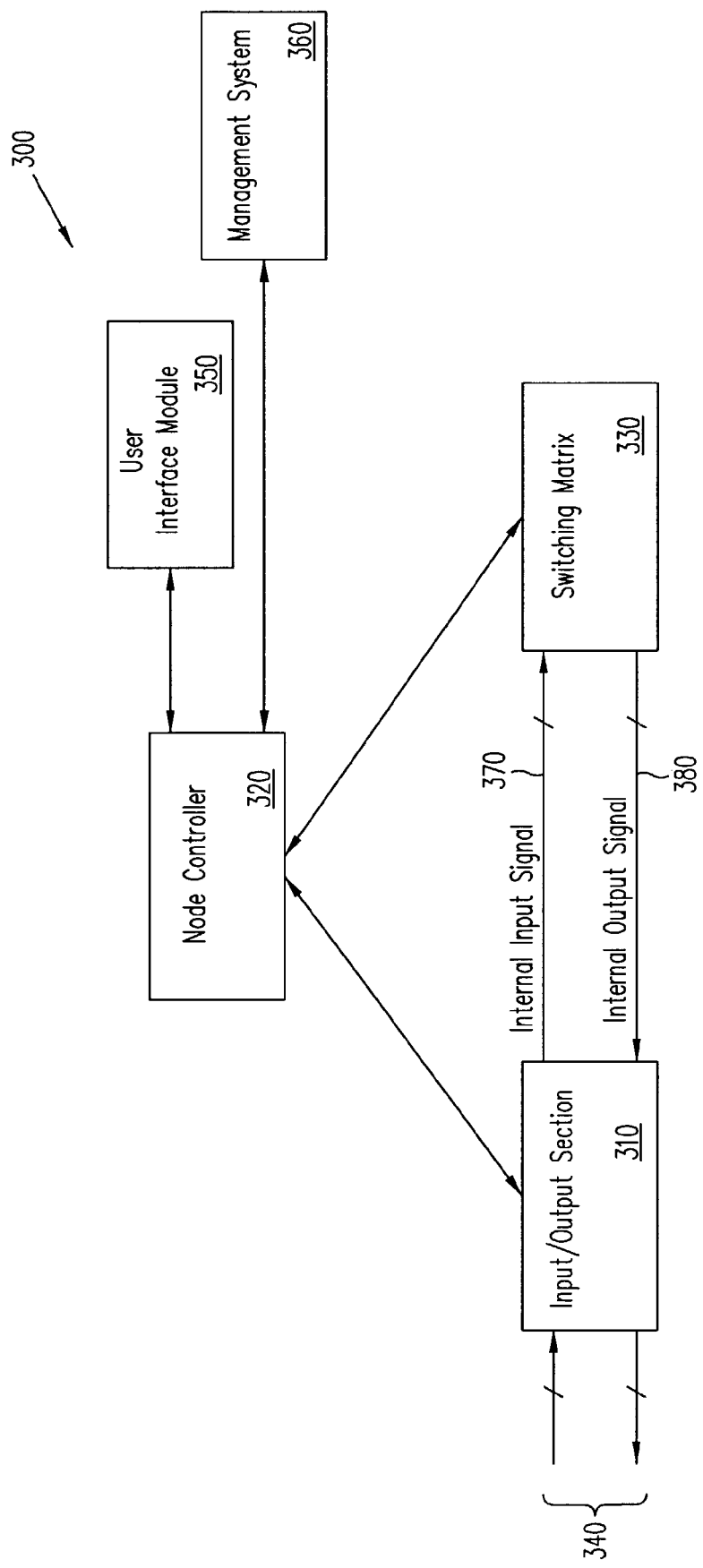
FIG. 3 is a block diagram of an exemplary router.

FIG. 3 illustrates a router 300. Router 300 includes an input/output section 310, a node controller 320, and a switching matrix 330. Node controller 320 contains, for example, real time software and intelligent routing protocols (not shown). Router 300 supports interfaces including, but not limited to, optical signal interfaces, a user interface module 350, and a management system 360. Internal input signals 370 and internal output signals 380 may be electrical or optical in nature.

In one embodiment, there are at least three types of processors in a router 300. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their runtime and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 300 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 300 is a multi-rack communications system capable of terminating at least 8192 signals and cross-connecting at least 4096 OC-48 signals. Such a router can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N).

Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/demultiplexing, and similar duties.

Signal Path

Figure 4:
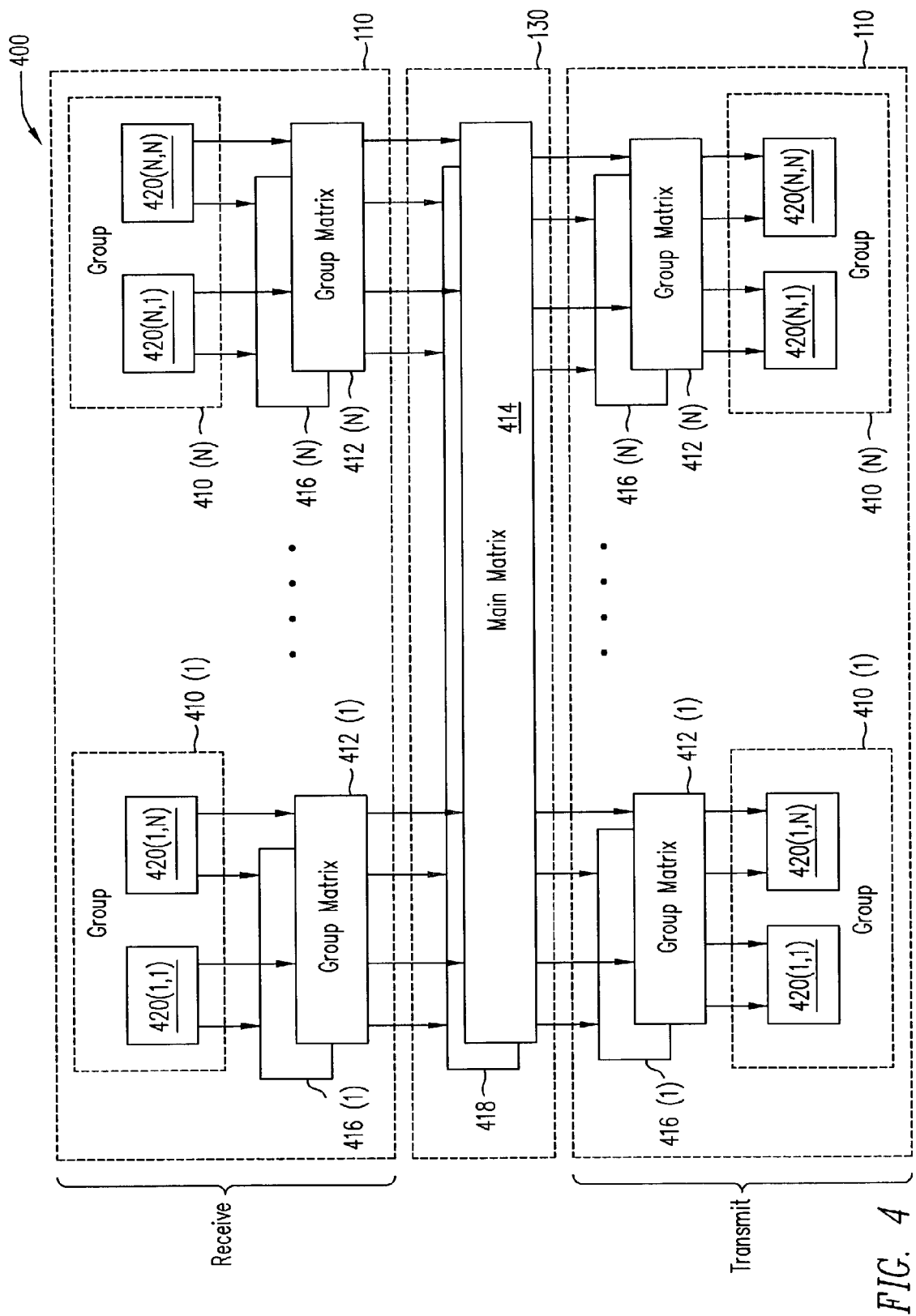
FIG. 4 is a block diagram of the signal paths and functional blocks of the router of FIG. 3.

FIG. 4 is a block diagram of signal paths 400 within router 300. The primary signal paths in router 300 include one or more groups exemplified by groups 410(1)-(N), group matrices 412(1)-(N), and a main matrix 414. As depicted in FIG. 3, groups 410(1)-(N), and group matrices 412(1)-(N) are shown as having receive and transmit sections. Groups 410(1)-(N) each include line cards 420(1,1)-(1,N), through line cards 420(N,1)-(N,N). Signals from line cards 420(1,1)-(N,N) are sent to the corresponding group matrix. In one embodiment, two sets of the group matrix cards, group matrices 412(1)-(N) and 416(1)-(N) are employed. Main matrix 414 is also mirrored in one embodiment by a redundant copy, a backup main matrix 418, which together form switching matrix 330. As shown in FIG. 4, the redundancy for group matrices 412(1)-(N) (i.e., group matrices 416(1)-(N)), is also provided on the transmit side.

It will be noted that the variable identifier "N" is used in several instances in FIG. 4 (and subsequent use of other variables, such as "m," "x," "k," and others) to more simply designate the final element (e.g., group matrix 412(N), line card 420(N,N), and so on) of a series of related or similar elements (e.g., group matrices 412(1)-(N), line cards 420(1,1)-(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 412(N) may be the tenth group matrix in a series of group matrices, whereas line card 420(N,N) may be the forty-eighth line card in a series of line cards.

Using signal paths 400 as an example, data enters the system at one of line cards 420(1,1)-(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 412(1)-(N) and 416(1)-(N) in FIG. 3. In one embodiment, group matrices 412(1)-(N) and 416(1)-(N) are used mainly as 2:1 reduction stages that select one of two optical signals and pass the selected optical signal to switching matrix 330. This allows the implementation of a variety of protection schemes (including 1:N, or 0:1) without having to use any additional ports on main matrix 414. All protect signals are terminated at group matrices 412(1)-(N) and 416(1)-(N). In order to maximize bandwidth, it is preferable that only active signals be passed through to switching matrix 330.

In one embodiment, switching matrix 330 is an errorless, rearrangeably non-blocking switching network. In one embodiment, switching matrix 330 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 330, an optical signal may be routed to an I/O shelf that (optionally) splits the optical signal into two signals. One of the signals is sent to an active line card, while the other, when available, is sent to a backup card.

Line cards 420(1,1)-(N,N) receive optical signals from group matrices 412(1)-(N) and 416 (1)-(N) which are in turn connected to two separate copies of the main matrix. Line cards 420(1,1)-(N,N) monitor both signals for errors and, after a user-defined integration period, switch to the backup signal if that signal exhibits better bit error rate (BER) performance than the prior active signal. This scheme, referred to herein as 1-plus-1, allows line cards 420(1,1)-(N,N) to select between the two copies of the group matrix without any level-1 or level-2 CPU intervention. This helps to ensure that such a switch can be made in 50 ms or less (per Bellcore's recommendations in GR-253 (GR-253: Synchronous Optical Network (SONET) Transport Systems, Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 5:
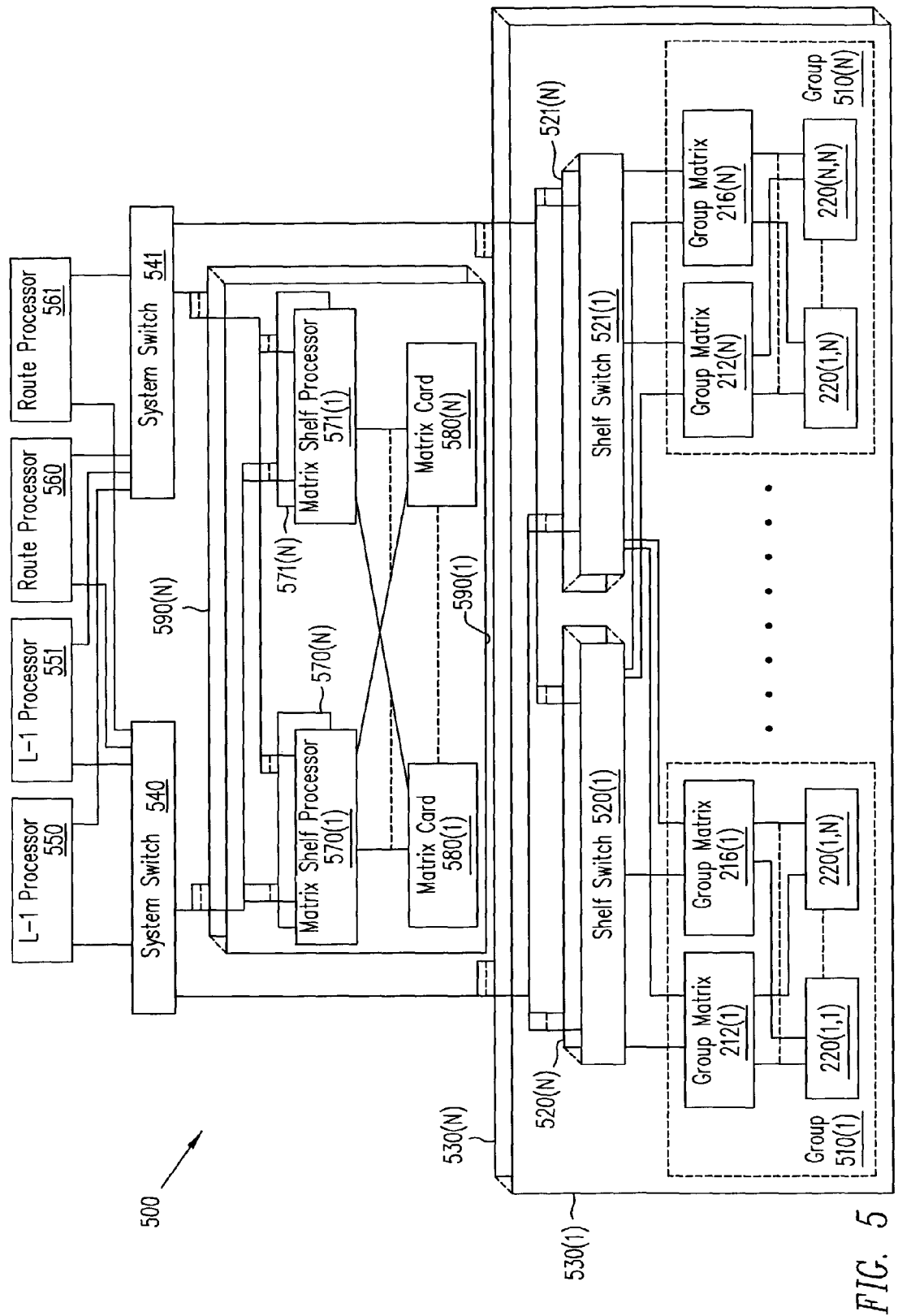
FIG. 5 is a block diagram of the control paths of the router of FIG. 3.

FIG. 5 illustrates a control path 500 of a router, such as router 300. Control path 500 includes all non-payload-related flows within the system and the hardware and software necessary to the control of the signal paths illustrated in FIG. 4. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 5 as group matrices 412(1)-(N) and 416(1)-(N). Each one of group matrices 412(1)-(N) and 416(1)-(N), also referred to herein as a hub, a repeater, or concentrator, is a physical layer device and preferably supports a star network topology, such as the IEEE 802.3 10BASE-T networking standard. The redundant connections from line cards 420(1,1)-(N,N) in each of groups 510(1)-(N) are connected to two repeaters that reside on two separate copies of the group matrix module. Preferably, each one of line cards 420(1,1)-(N,N) supports two network ports (e.g., 10BASE-T Ethernet ports). The two sets of four signals from each port pass through a relay that selects one of them for connection to the LAN for purposes of redundancy. Groups 510(1)-(N) represent the first layer of the control bus hierarchy. Group matrices 412(1)-(N) and 416(1)-(N) are each controlled by a shelf processor (not shown, for the sake of clarity) and communicate with one of the shelf switches described below via LAN connections.

Shelf Ethernet Switch

FIG. 5 also illustrates certain features of router 300 pertaining to the relationship between shelf switches 520(1)-(N) and 521(1)-(N), and groups 510(1)-(N). Groups 510(1)-(N) are again shown, with regard to the control functions thereof. In this depiction of groups 510(1)-(N), line cards 420(1,1)-(N,N) are shown as being attached to networking devices, indicated here as group matrices. Group matrices 412(1)-(N) and 416(1)-(N) may be, for example, multi-port Ethernet hubs running at 10 Mbps. Each of line cards 420(1,1)-(N,N) feed signals into two of group matrices 412(1)-(N) and 416 (1)-(N). For example, line card 420(1,1) feeds received information to group matrices 412(1) and 416(1). Group matrices 412(1)-(N) and 416(1)-(N) each feed a signal into shelf switches 520(1)-(N) and 521(1)-(N) of FIG. 4. Shelf switches 520(1)-(N) and 521(1)-(N) are each controlled by a shelf processor (not shown for the sake of clarity) and communicate with one of the system switches (not shown, for the sake of clarity).

Shelf switches 520(1)-(N) and 521(1)-(N) are the next higher level of the control hierarchy in router 300, and are located on the shelf processor module (exemplified by line racks (530(1)-(N)). Each copy of shelf switches 520(1)-(N) and 521(1)-(N) interconnects six connections from the three groups in each shelf, another connection from the shelf processor, and one connection from system switch 540 (and 541). Shelf switches 520(1)-(N) and 521(1)-(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 540 and 541 in FIG. 5. This fully redundant scheme prevents failures on one switch from taking down the entire control bus. In one embodiment, a system switch manages connections from the following sources:

1. High-speed connection(s) from shelf switches 520(1)-(N) and 521(1)-(N);
2. High-speed connection(s) to higher-level processors (e.g., redundant level-1 processors 550 and 551, and redundant route processors 560 and 561); and
3. High-speed connection(s) to matrix shelf processors 570(1)-(N) and 571(1)-(N) which, in turn, control matrix cards 580(1,1)-(1,N)), located in main matrix racks 590(1)-(N).

It will be noted that main matrix 414 includes matrix cards 580(1,1)-(1,N), and that, more generally, main matrices 414 and 418 are included matrix racks 590(1)-(N).

System switches 540 and 541 are located in a management bay. As noted, the fully redundant switches manage connections from various router elements, such as I/O and matrix bays, level-1 processors, and route processors. Each of level-1 processors 550 and 551 and route processors 560 and 561 is preferably connected to system switches 540 and 541 using 100 Mbps Ethernet connections in a configuration that creates an expandable, efficient, and fully redundant control bus.

The components of router 300 are described in further detail in patent application Ser. No. 09/477,166, filed Jan. 4, 2000, and entitled "METHOD AND APPARATUS FOR A REARRANGEABLY NON-BLOCKING SWITCHING MATRIX," having A. Saleh, D. Duschatko, and L. Quibodeaux as inventors, which is hereby incorporated by reference, in its entirety and for all purposes.

Main Matrix

Figure 6A:
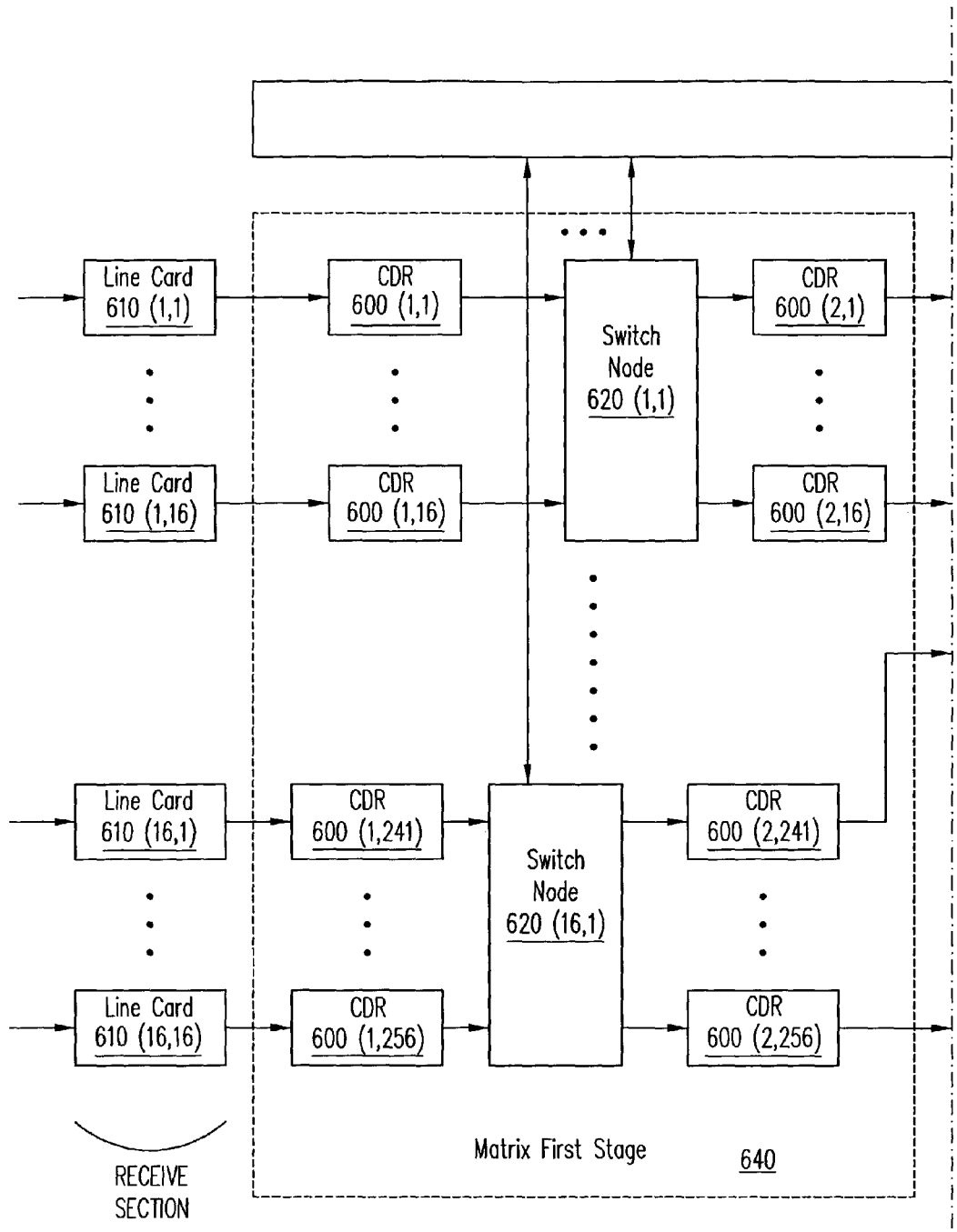
FIGS. 6A, 6B and 6C, referred to subsequently as FIG. 6, illustrate a view of a switching matrix that includes clock/data recovery units and connections to the line cards.
Figure 6:
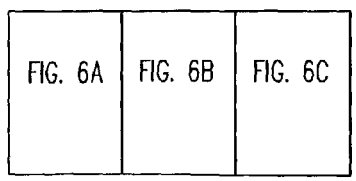
Figure 6B:
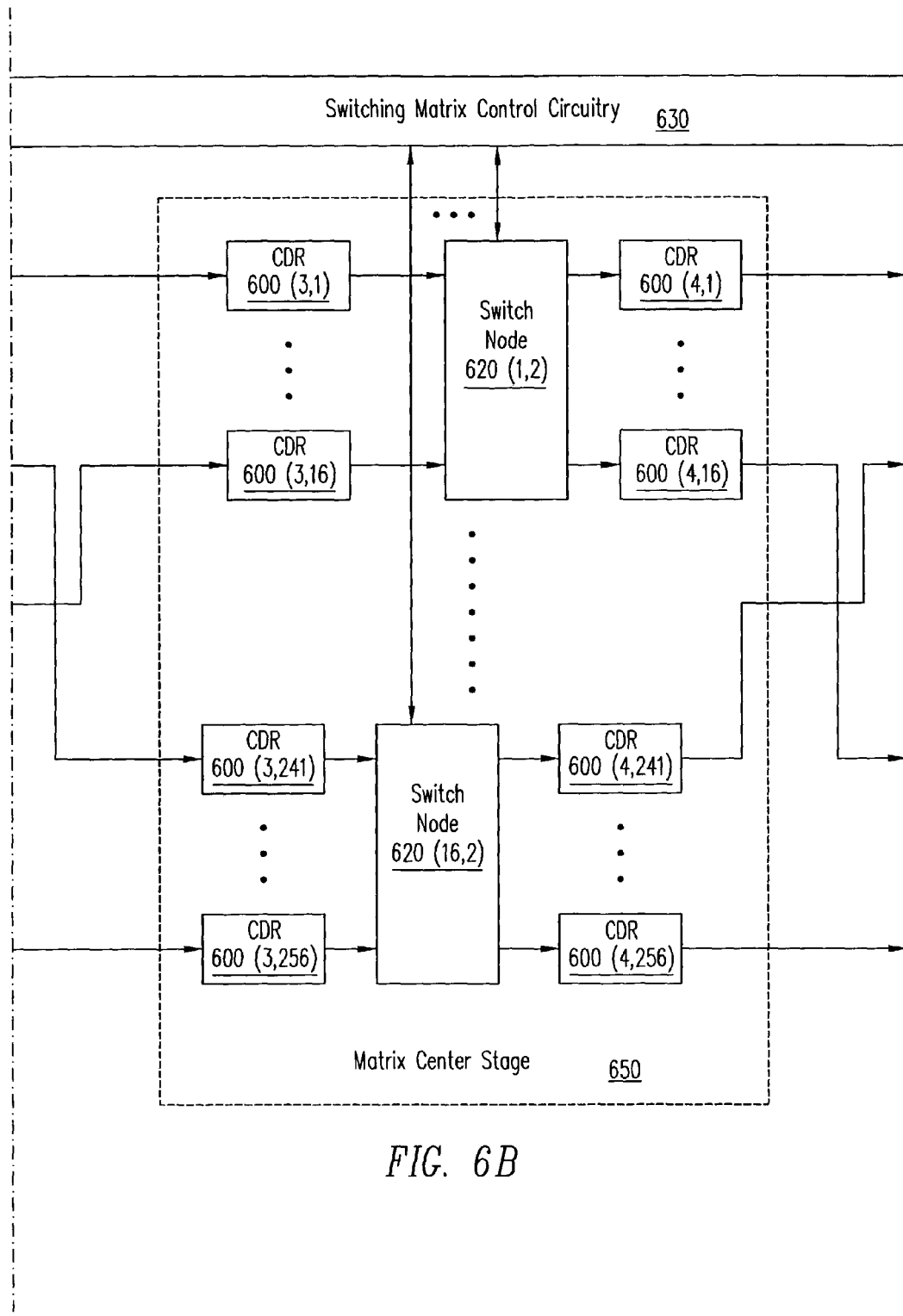
Figure 6C:
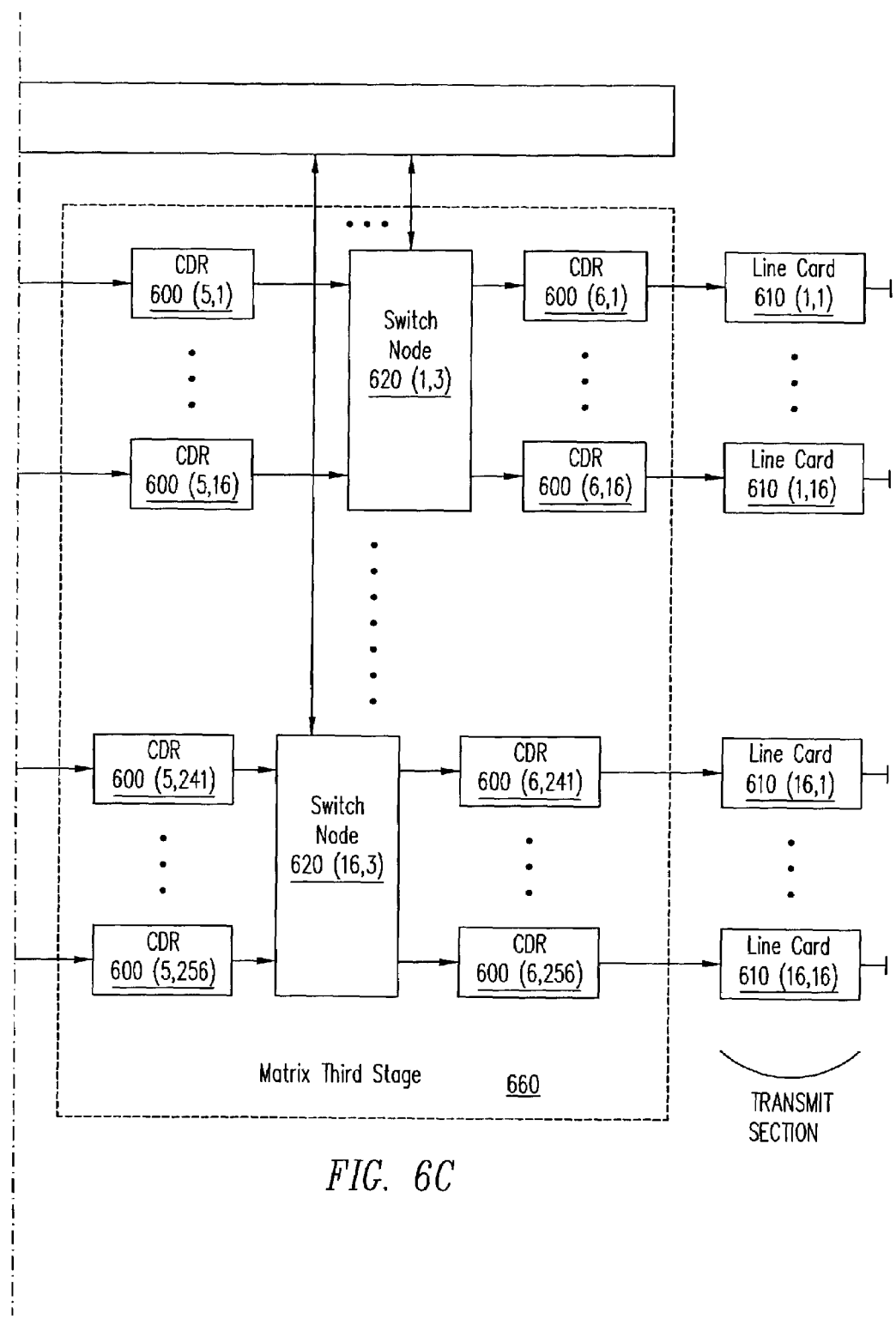

FIG. 6 illustrates a more detailed view of switching matrix 330, including connections to the line cards. The depiction of switching matrix 330 in FIG. 6 shows certain details, such as clock/data recovery units (CDRs) 600(1,1)-(6,256) and line cards 610(1,1)-(16,16). A CDR recovers clock and data information from a serial bitstream by recovering the clocking signal from the incoming bitstream (e.g., using a phase-locked loop (PLL)), and then recovering the data using the clock thus recovered. In one embodiment, switching matrix 330 employs a 256×256 matrix, an array of switching nodes 620(1,1)-(16,3), each a 16×16 crossbar switch that allows any input signal to be connected to any of its outputs, regardless of the current state of the crossbar. The embodiment illustrated in FIG. 6 thus supports the switching of up to 256 inputs to any one of 256 outputs.

The cross-connect information (i.e., input-to-output mapping) is written into the crosspoint switch by a local microcontroller which receives the information from the local shelf processor. The shelf processor receives such information from the node controller. This hierarchy can be extended indefinitely. The crosspoint switch receives high speed serial data from the optical receivers that perform optical-to-electrical conversion on the received optical signals. Data from the crosspoint switch is re-timed to synchronize the data with the system clock of router 300, using a clock and data recovery (CDR) unit, before being converted back into an optical signal that connects to the next stage of the matrix over fiber-optic cables.

It will be noted that line cards 610(1,1)-(16,16) correspond loosely to line cards 420(1,1)-(N,N), as depicted in FIG. 4. It will also be noted that line cards 610(1,1)-(16,16) are each shown as being divided into a receive section and a transmit section as shown in FIG. 6, again in a fashion similar to that depicted in FIG. 4. Also depicted in FIG. 6 are switch nodes 620(1,1)-(16,3) and a switching matrix control circuit 630. More generically, the control function represented by switching matrix control circuitry 630 is depicted in FIG. 5 as matrix shelf processors 570(1)-(N) and 571(1)-(N). As previously noted, switch nodes 620(1,1)-(16,3) and their related CDRs are divided into three stages, which are depicted in FIG. 6 as matrix first stage 640, matrix center stage 650, and matrix third stage 660. It will also be noted that the transmit side of line cards 610(1,1)-(16,16) each include CDR functionality.

Figure 7A:
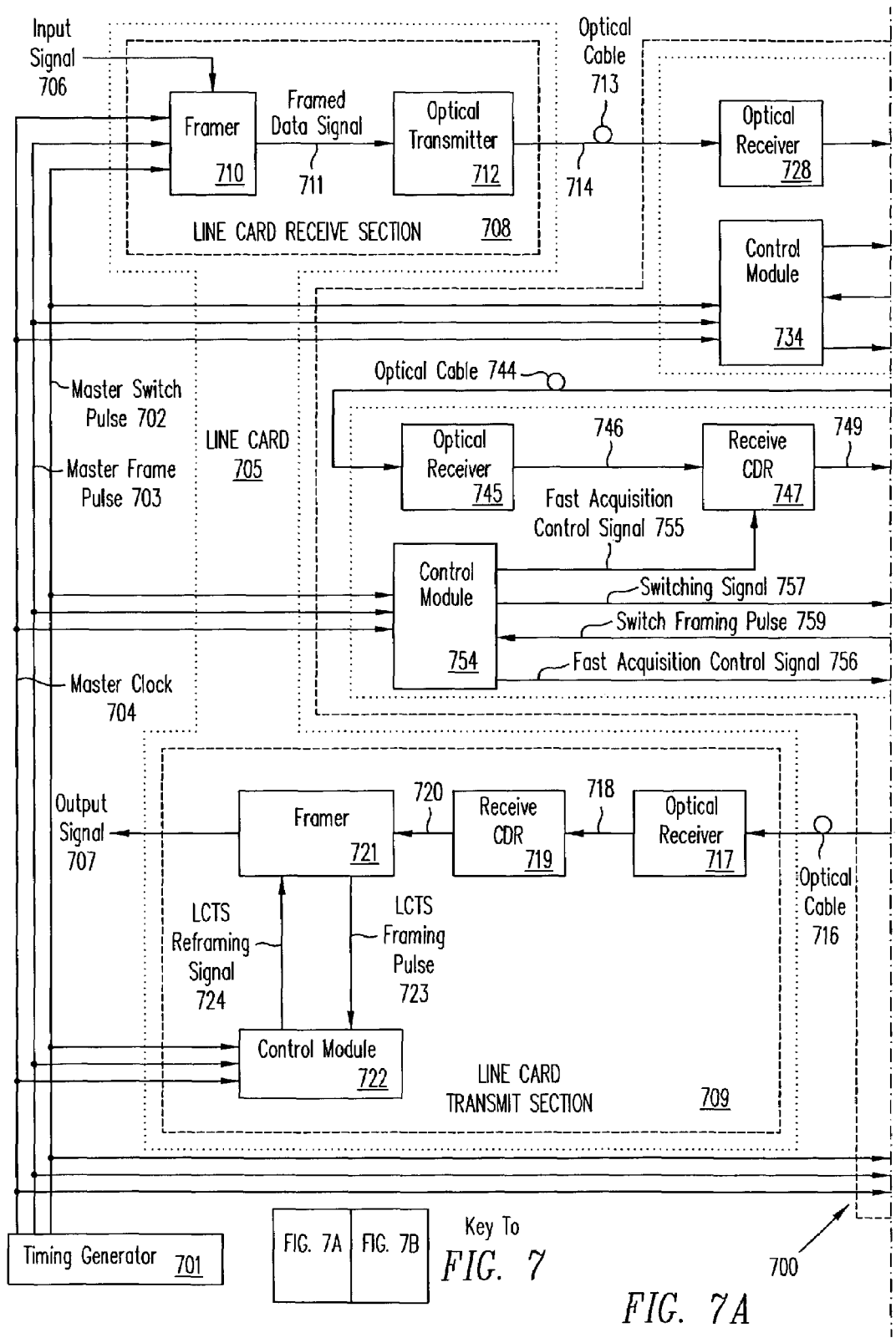
FIGS. 7A and 7B, referred to subsequently as FIG. 7, illustrate one embodiment of an errorless rearrangement path.
Figure 7B:
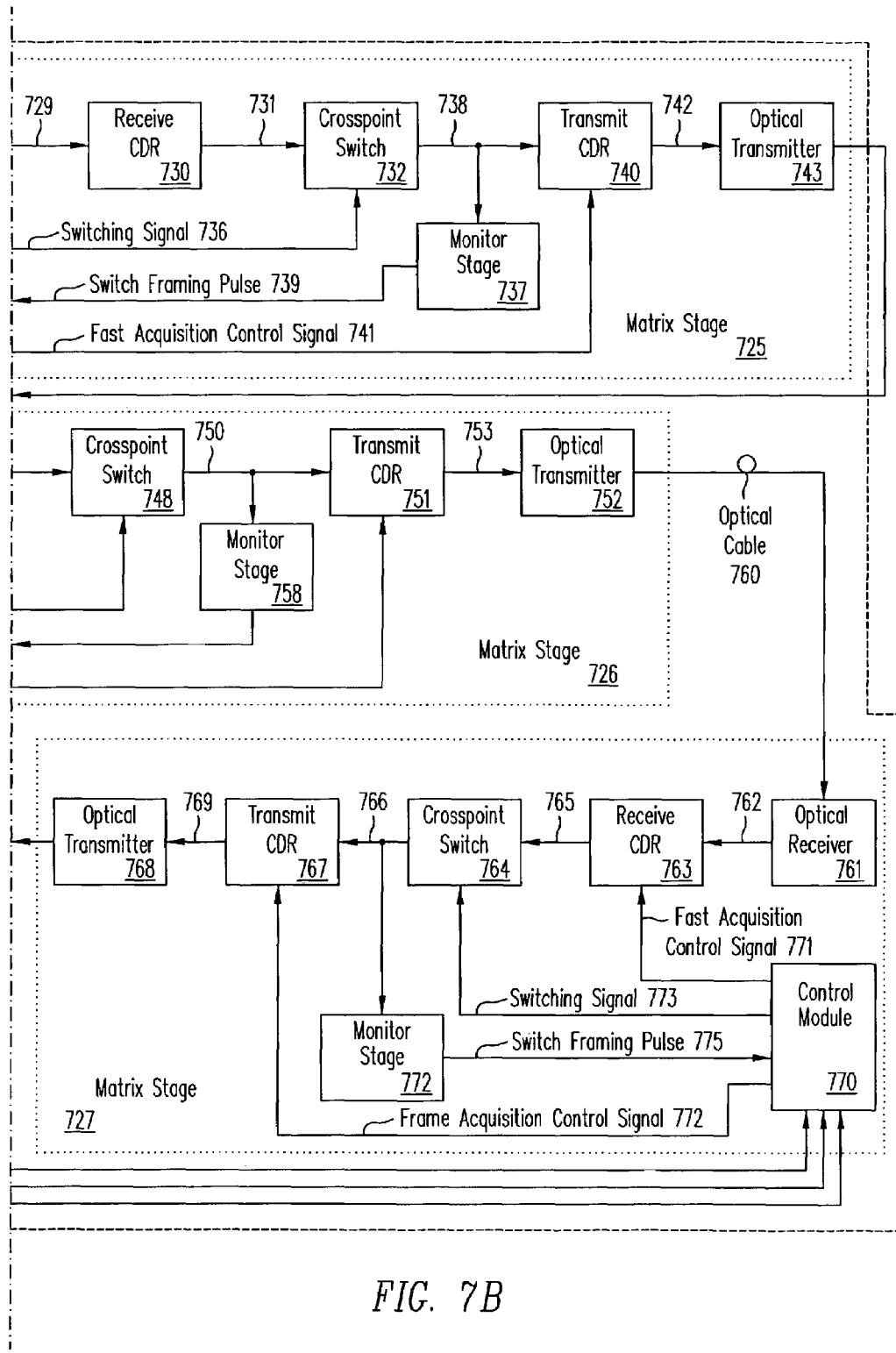

FIG. 7 illustrates one embodiment of an errorless rearrangement path (ERP) 700 according to the present invention. The following description is cast in terms of the signals being transferred. A timing generator 701 is provided to generate global timing and control signals that are used by a number of the subsystems in router 300. Normally, only a single such timing generator is employed, although a back-up timing generator may be desirable. Timing generator 701 generates, among other signals, a master switch pulse 702, a master frame pulse 703, and a master clock 704. Master switch pulse 702 provides an indication to all subsystems of router 300 that a switch of the matrix is being executed, and in particular, that all crosspoint switches should reconfigure themselves per the configuration preloaded into them. Master frame pulse 703 is used by framers and other subsystems to generate proper framing of the received signal. Master clock 704 is the standard clock distributed to the various subsystems of router 300. The major components of interest and their various subsystems are now described.

A line card 705 is shown as receiving an input signal 706 and transmitting an output signal 707. In accordance with the depiction of signal paths 400 in FIG. 4, line card 705 is divided into a line card receive section (LCRS) 708 and a line card transmit section (LCTS) 709. This is reflected in FIGS. 4 and 6 by the notations regarding the line cards having receive and transmittal sides. Line card receive section 708 receives input signal 706 at a framer 710. Framer 710 generates a framed data signal 711 using master frame pulse 703 to generate proper framing of input signal 706. Framer 710 includes a programmable delay counter (not shown) that allows the output framing location to be relocated relative to master frame pulse 703. This allows the framing of input signal 706 to account for the differing delays that may be caused by differences in cable length.

Framed data signal 711 is then provided to optical transmitter 712 for transmission across an optical cable 713 (as an optical signal 714) to matrix 715. Line card transmit section 709 receives an optical signal over an optical cable 716 at an optical receiver 717. Optical receiver 717 converts the optical signal into an electrical signal (a signal 718), which is in turn provided to a receive CDR 719. Receive CDR 719 recovers the clock and data from signal 718, providing the resulting signal (a signal 720) to a framer 721.

Framer 721, under the control of a line card transmit section (LCTS) control module 722, generates output signal 707 with the proper framing. In order to properly frame the data in signal 720, LCTS control module 722 receives master switch pulse 702, master frame pulse 703, and master clock 704 from timing generator 701, and LCTS framing pulse 723 from framer 721. LCTS control module 722 uses these signals to generate an LCTS reframing signal 724, which is provided to framer 721. LCTS reframing signal 724 is used to control the fast reframing of framer 721 upon the switching of matrix 715.

Matrix 715 includes a matrix stage 725, a matrix stage 726, and a matrix stage 727. Matrix stage 725 receives the optical signal from line card receive section 708 (an optical signal 714) at an optical receiver 728, which converts optical signal 714 into an electrical signal (a signal 729). Clock and data information are recovered from signal 729 by a receive CDR 730. Receive CDR 730 passes the recovered signal (a signal 731) to a crosspoint switch 732. Crosspoint switch 732 is controlled by a control module 734 via a switching signal 736.

Control module 734 monitors the output of crosspoint switch 732 by the use of a monitor stage 737, which frames to the output of crosspoint switch 732 (a signal 738) and generates a switch framing pulse 739. Signal 738 is provided to a transmit CDR 740 for clock recovery and recovery of the data signal under the control of a fast acquisition control signal 741 that is generated by control module 734. Transmit CDR 740 recovers clock and data information from signal 738 to recover a signal 742, which is then provided to an optical transmitter 743. Optical transmitter 743 converts signal 742 from an electrical signal into an optical signal that is transmitted from matrix stage 725 to matrix stage 726 over an optical cable 744.

Certain aspects of fast framing (fast acquisition) and related aspects are described in further detail in patent application Ser. No. 09/629,474, filed Jul. 31, 2000, and entitled "METHOD AND APPARATUS FOR DETECTING ERRORS IN A BACKPLANE FRAME," having D. Duschatko, L. Quibodeaux, R. Hall and A. Thurston as inventors, which is hereby incorporated by reference, in its entirety and for all purposes.

Optical receiver 745 of matrix stage 726 receives the optical signal provided via optical cable 744 and converts the optical signal into an electrical signal (a signal 746) that is, in turn, provided to a receive CDR 747. Receive CDR 747 recovers clock and data information from signal 746 and provides this data to crosspoint switch 748 as a signal 749. Crosspoint switch 748 switches signal 749 to an output that appears at an output of crosspoint switch 748 as signal 750, which is in turn provided to transmit CDR 751. Transmit CDR 751 recovers clock and data information, once again, and provides this data to an optical transmitter 752 as a signal 753.

A control module 754 controls the switching of crosspoint switch 748 and the relocking of receive CDR 747 and transmit CDR 751. Control module 754 provides fast acquisition control signals 755 and 756 to receive CDR 747 and transmit CDR 751, respectively. Control module 754 causes crosspoint switch 748 to switch using a switching signal 757. A monitor stage 758 receives signal 750 from crosspoint switch 748 and frames to signal 750 in order to generate a switch framing pulse 759, which is then provided to control module 754. Control module 754 generates the fast acquisition and switching signals using switch framing pulse 759 in combination with master switch pulse 702, master frame pulse 703, and master clock 704. Optical transmitter 752 converts signal 753 into an optical signal that is provided to matrix stage 726 via an optical cable 760.

The configuration of matrix 727 is substantially similar to that of matrix stage 726. Matrix stage 727 receives the optical signal transmitted by optical transmitter 752 over optical cable 760 at an optical receiver 761 and converts the optical signal into an electrical signal (a signal 762). Signal 762 is in turn provided to a receive CDR 763, which recovers clock and data information from signal 762, and provides the recovered data information to crosspoint switch 764 as a signal 765. Crosspoint switch 764 switches signal 765 to an output that appears at an output of crosspoint switch 764 as signal 766, which is in turn provided to transmit CDR 767. Transmit CDR 767 recovers clock and data information, once again, and provides the recovered data information to an optical transmitter 768 as a signal 769.

Controlling the switching of crosspoint switch 764 and the relocking of receive CDR 763 and transmit CDR 767 is a control module 770. Control module 770 provides fast acquisition control signals 771 and 772 to receive CDR 763 and transmit CDR 767, respectively. Control module 770 controls the switching of crosspoint switch 764 using a switching signal 773. A monitor stage 774 receives signal 766 from crosspoint switch 764 and frames to signal 766 in order to generate a switch framing pulse 775, which is then provided to control module 770. Control module 770 generates the fast acquisition and switching signals using switch framing pulse 775 in combination with master switch pulse 702, master frame pulse 703, and master clock 704. Optical transmitter 768 converts signal 769 into an optical signal (an optical signal 776) that is provided to LCTS 709 via optical cable 716 for transmission as output signal 707. The operations performed by LCTS 709 in generating output signal 707 have been explained previously.

Certain of these signals and their relationships are now described in further detail. The signals from timing generator 701 include:

1. Master switch pulse 702: The master signal indicating that switching (an errorless switch) should be initiated (sent to all modules).
2. Master frame pulse 703: The master frame pulse signal sent to all modules to allow the modules to recognize framing.
3. Master clock 704: The master clock signal distributed to all modules. In a system configured to support OC-48 optical signals (2.488 Gbps), this is a 155.52 MHz clock.

As also shown in FIG. 7, the signals within matrix stage 725 include:

1. Signal 729, which is the framed data output from optical receiver 728 corresponding to optical signal 714 and the input to receive CDR 730.
2. Signal 731, which is the framed data output recovered by receive CDR 730 and input to crosspoint switch 732.
3. Signal 738, which is the framed data output switched by crosspoint switch 732, and input to transmit CDR 740 and monitor stage 737.
4. Signal 742, which is the framed data output recovered by transmit CDR 740 and input to optical transmitter 743.
5. Switch framing pulse 739, which is the signal indicating the start of frame location in signal 738.
6. Switching signal 736, which is the signal that provides the switch pulse causing crosspoint switch 732 to assume a new switch configuration.

7. Fast acquisition control signal 741, which is the signal generated by control module 734 that causes transmit CDR 740 to perform a fast lock action on signal 738.

FIG. 7 depicts matrix stage 726 as including the following signals:
1. Signal 746, which is the framed data output from optical receiver 745 corresponding to the optical signal transmitted by optical transmitter 743 and input to receive CDR 747.
2. Signal 749, which is the framed data output recovered by receive CDR 747 and input to crosspoint switch 748.
3. Signal 750, which is the framed data output switched by crosspoint switch 748, and input to transmit CDR 751 and monitor stage 758.
4. Signal 753, which is the framed data output recovered by transmit CDR 751 and input to optical transmitter 752.
5. Switch Framing Pulse 759, which is the signal indicating the start of frame location in signal 750.
6. Switching signal 757, which is the signal that provides the switch pulse causing crosspoint switch 748 to assume a new switch configuration.
7. Fast acquisition control signals 755 and 756, which are the signals generated by control module 754 that causes receive CDR 747 and transmit CDR 751 to perform a fast lock action on signals 746 and 750, respectively.

Signals within matrix stage 727 include:
1. Signal 762, which is the framed data output from optical receiver 761 and the input to receive CDR 763.
2. Signal 765, which is the framed data output recovered by receive CDR 763 and input to crosspoint switch 764.
3. Signal 766, which is the framed data output switched by crosspoint switch 764, and input to transmit CDR 767 and monitor stage 772.
4. Signal 769, which is the framed data output recovered by transmit CDR 767 and input to optical transmitter 768.
5. Switch Framing Pulse 775, which is the signal indicating the start of frame location in signal 766.
6. Switching signal 773, which is the signal that provides the switch pulse causing crosspoint switch 764 to assume a new switch configuration.
7. Fast acquisition control signals 771 and 772, which are the signals generated by control module 770 that causes receive CDR 763 and transmit CDR 767 to perform a fast lock action on signals 762 and 766, respectively.

Signals within LCTS 709 include:
1. Signal 718, which is the framed data output from optical receiver 717 and the input to receive CDR 719.
2. Signal 720, which is the framed data output recovered by receive CDR 719 and input to framer 721.
3. LCTS framing pulse 723, which is the frame pulse indicating the start of frame location in signal 720.
4. LCTS reframing signal 724, which is the reframe signal from control module 722 that causes framer 721 to freeze its clock input (on the falling edge of LCTS reframing signal 724) and then to restart clock and find framing pattern (on the rising edge of reframing signal 724).

Not shown in the block diagram is a common communications connection to all blocks that is used for initialization and status monitoring.

For purposes of this discussion, it is assumed that the data delay through all optical modules, CDRs and switches is negligible. However, cabling is expected to introduce substantial delays into the data signal. The measurement and management of cable-related data delays is therefore an important issue. This issue can arise, for example, in the following manner. Normally, multiple LCRSs are connected to matrix stage 725 (these LCRSs are merely represented by LCRS 708), and so the lengths of the cables connecting each of the LCRS modules to matrix stage 725 may be of differing lengths. Such differences in length can cause substantial variations in the delay experienced by the signals carried by these cables. Such delays should therefore be compensated for, and, given their variation, compensated for independently (e.g., via a delay register in the signal's respective framer (e.g., framer 710)).

In this regard, it will be noted that multiple copies of the single data path shown exist for each of matrix stages 725, 726, and 727, as do multiple copies of the optical cable connecting matrix stages 725 and 726 (e.g., optical cable 744). All such cables are preferably of matched length. Multiple copies of the cable connecting matrix stage 726 and 727 (e.g., optical cable 760) are used, with all such cables preferably of matched length. However, in a fashion similar in regard to the LCRS modules, multiple LCTS modules are normally connected to matrix stage 727 via optical cabling (e.g., optical cable 716). These cables may also be of differing lengths. As before, such variation in delay should be accounted for. Preferably, the LCTS modules are designed to accommodate such variation.

Prior to being transferred through router 300, one embodiment of the present invention rearranges the information present in the incoming data to maximize the amount of time available for relocking. As noted, a certain amount of time is required for the various subsystems in router 300 to re-acquire clock information and phase lock onto the incoming data stream. Because switching is performed during a relocking period, the longer the relocking period can be made, the less onerous the burden on the system's design (in terms of the speed with which relocking must be accomplished in order to avoid errors in the live data passing through router 300). By rearranging the incoming data, unused bit times throughout a frame may be made contiguous, thereby increasing the amount of time available for relocking. One scheme for rearranging the data in an incoming SONET frame is now described.

Errorless Rearrangement

FIG. 8 illustrates a standard frame of the synchronous optical network (SONET) protocol, exemplified here by a SONET frame 800. SONET frame 800 is divided horizontally into ninety columns and is divided vertically into nine rows. The first three columns of SONET frame 800 contain overhead bytes used for framing, communications, and other purposes. The remaining 87 columns contain data and are collectively referred to as payload. The overhead bytes include an A1 byte 802, an A2 byte 804, a J0/Z0 byte 806, a B1 byte 810, an E1 byte 812, an F1 byte 814, a D1 byte 820, a D2 byte 822, a D3 byte 824, an H1 byte 830, an H2 byte 832, an H3 byte 834, an H4 byte 836, a B2 byte 840, a K1 byte 842, a K2 byte 844, a D4 byte 850, a D5 byte 851, a D6 byte 852, a D7 byte 853, a D8 byte 854, a D9 byte 855, a D10 byte 856, a D11 byte 857, a D12 byte 858, an S1/Z1 byte 870, an M1/Z2 byte 872, and an E2 byte 874. Also included in SONET frame 800 is payload data, represented here by payload bytes 890-898. It will be noted that each of payload bytes 890-898 includes 87*48 bytes of data for an OC-48 SONET frame (except payload bytes 893, which includes 86*48 bytes of data (due to the existence of H4 byte 836)).

In certain embodiments of the present invention, these overhead bytes and payload are rearranged in order to support errorless switching in switching matrix 330. In one embodiment, the overhead bytes are moved to the beginning of the frame used to transport data through a system such as router 300. By moving the overhead bytes to the beginning of the frame, the byte times are concatenated in order to support the relock of the CDRs within router 300 by increasing the time available for relock.

It will be noted that certain of the overhead bytes in FIG. 8 are marked with the letter U. This indicates the bytes so marked are stripped off by protocol processor 420 and are thus unused in the switching of the data streams represented by SONET frame 800 while the data is within router 300. These bytes are preferably the bytes "rearranged" to form an extended period of time during which relocking can occur. In fact, because these bytes are stripped off, other bytes are simply moved into their position, overwriting the stripped-off bytes and making room at the beginning of the frame for the relocking operation. One example of such a rearranged frame, referred to herein as an errorless switching frame (ESF), is given below.

Figure 9:
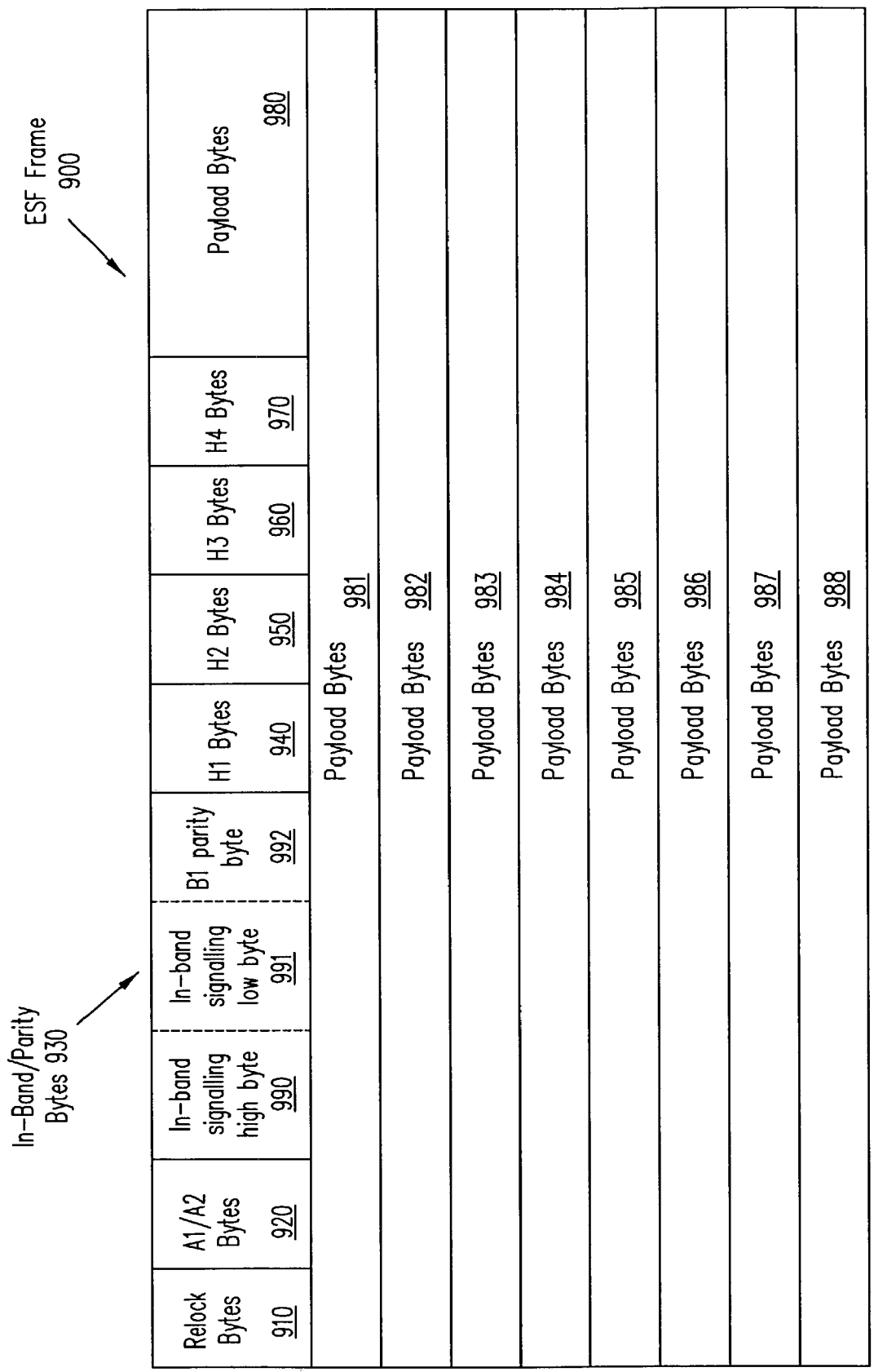
FIG. 9 illustrates one embodiment of an errorless switching frame.

FIG. 9 illustrates one embodiment of an ESF 900, generated by rearranging a SONET frame received by router 300. ESF 900 includes relock bytes 910, A1/A2 bytes 920 (corresponding to A1 byte 802 and A2 byte 804 of SONET frame 800), in-band/parity bytes 930, H1 bytes 940 (corresponding to H1 byte 830 of SONET frame 800), H2 bytes 950 (corresponding to H2 byte 832 of SONET frame 800), H3 bytes 960 (corresponding to H3 byte 834 of SONET frame 800), H4 bytes 970 (corresponding to H4 byte 836 of SONET frame 800), and payload bytes 980-1688 (corresponding to payload bytes 890-898 of SONET frame 800). In protocol processor 420, the overhead bytes of SONET frame 800 marked as unused ("U") are "moved" to the position of relock bytes 910 (as well as A1/A2 bytes 920 and in-band/parity bytes 930) by moving payload or control information into the unused bytes. In effect, the overhead bytes of SONET frame 800 marked as unused can simply be overwritten when rearranging the frame. The data is preferably rearranged such that a relatively large number of bytes at the beginning of the frame are made available for use in performing the errorless switching operation, and most preferably, that a maximum number of bytes at the beginning of the frame are made available for such purposes.

Relock bytes 910 are inserted in place of these first bytes. Relock bytes 910 preferably consist of data that will create signals rich in transitions. This eases the CDRs' task of re-acquiring phase lock, because each transition is an opportunity for the CDRs' to begin the process of re-acquiring clocking information. One example of a bit pattern rich in transitions is a binary representation of the hexadecimal number "55", which produces a string of alternating 1's and 0's (with a transition between each bit time).

A1/A2 bytes 920 represent A1 byte 802 and A2 byte 804 from 48 STS-1 channels in an OC-48 signal. A1/A2 bytes 920 may include, for example, 24 bytes of the A1 framing byte and 24 bytes of the A2 framing byte. In-band bytes 930 may be divided into an in-band signaling high byte 990, an in-band signaling low byte 991, and a B1 parity byte 992. The next four portions of ESF 900 are pointer and payload bytes from the 48 STS-1 channels supported by the OC-48 SONET frame. H1 bytes 940 include the H1 pointer bytes from each of the 48 STS-1 channels. In similar fashion, H2 bytes 950 contain the H2 pointer bytes from those STS-1 channels, H3 bytes 960 contain the H3 stuff bytes from the 48 STS-1 channels, and H4 bytes 970 contain the 48 H4 stuff bytes from the 48 STS-1 channels. Payload bytes 980-1688 contain their respective portions of the payload bytes of the 48 STS-1 channels supported by the OC-48 stream.

In one embodiment, in-band/parity bytes 930 are actually a 48-byte column in which three of the bytes are used for in-band signaling high byte 990, in-band signaling low byte 991, and B1 parity byte 992, with the remaining 45 bytes being reserved. While the H1, H2, and H3 bytes of each of the STS-1 channels of the OC-48 stream are defined, in some embodiments, the H4 byte of each channel can be considered to be part of the SONET payload. The various fields in row 1 of ESF 900 are shown in Table 2.

TABLE 2

Detail of an exemplary layout of errorless switching frame 900.

| Row 1 Byte Numbers | # of Bytes | Overhead Byte Name | Notes |
|---|---|---|---|
| 1-1056 | 1056 | 1056-RLK bytes | Used to relock CDRs. Relocking pattern is preferably transition (edge) rich (e.g., a pattern of 0x55) |
| 1057-1080 | 24 | 24-A1 bytes | Framing Byte. A1 pattern = 0xF6 |
| 1081-1104 | 24 | 24-A2 bytes | Framing Byte. A2 pattern = 0x28 |
| 1105 | 1 | 1-IBH byte | Inband Signaling High-byte |
| 1106 | 1 | 1-IBL byte | Inband Signaling Low-byte |
| 1107 | 1 | 1-byte B1 | B1 Parity Byte |
| 1108-1152 | 45 | 45-Reserved bytes | Fixed pattern = 0x00. Reserved. |
| 1153-1200 | 48 | 48-H1 bytes | Pointer Byte. H1 = H1 pointer byte |
| 1201-1248 | 48 | 48-H2 bytes | Pointer Byte. H2 = H2 pointer byte |
| 1249-1296 | 48 | 48-H3 bytes | Pointer Byte. H3 = H3 pointer action stuff byte |
| 1297-1344 | 48 | 48-H4 bytes | Payload Byte. H4 = stuff byte position |
| 1345-4320 | 2976 | 2976-payload bytes | Payload Bytes |

As noted, relock bytes 910 preferably contained a pattern of 1's and 0's (e.g., a hexadecimal value of "55"). This pattern is used to help the CDRs along the signal path within router 300 to re-acquire phase lock quickly during the rearrangement of switching matrix 330 by providing a signal rich in edges (i.e., transitions) on which the PLLs of the CDRs can acquire lock. A1/A2 bytes 920 are framing bytes that preferably use a standard SONET format of F6 and 28, respectively. A full column of A1 and A2 bytes are preferably used to form A1/A2 920. As noted, in-band signaling high byte 990 and in-band signaling low byte 991 are provided to support in-band signaling, and so allow communication on an in-band basis over a network such as network 390. As will be apparent to one of skill in the art, the above format is merely exemplary. The information illustrated above may be organized in an alternate format, and various pieces of information omitted from ESF frame 900, or included in ESF frame 900 from SONET frame 800.

To help ensure the accurate transmission of data, B1 parity byte 992 is provided to allow parity checking through a system such as router 300. B1 parity byte 992 is preferably calculated using the standard SONET definition, and is preferably calculated across all bytes in ESF 900, save for relock bytes 910, and A1/A2 bytes 920. Relock bytes 910 and A1/A2 bytes 920 are excluded from this calculation to avoid the detection of false parity errors during the rearrangement of switching matrix 330. At such a time, the system will not be able to capture relock byte 910 and A1/A2 byte 920. As noted, the undefined bytes following in-band/parity bytes 930 are reserved and so are preferably set to a hex value of 0x00. In-band/parity bytes 930 and the undefined bytes which follow thus define a 48-byte column.

H1 bytes 940, H2 byte 950, and H3 bytes 960 are pointer bytes into the payload of the original SONET frame. In one embodiment, there are 48 copies of each of these bytes in order to support the 48 STS-1 channels in an OC-48 stream. Preferably, the values carried in H1 byte 940 and H2 byte 950 are modified from the standard SONET definition to allow for the different locations of various payload bytes in ESF 900. In a similar fashion, there are 48 copies of each STS-1 channel's H4 byte that make up H4 bytes 970, and it is the H4 byte that is used as a stuff position during pointer justifications (although the H4 byte may be considered as a part of the payload). Preferably, scrambling is used on data sent over the signal paths of router 300. More preferably, all bytes in ESF 900 are scrambled with the exception of relock bytes 910 and A1/A2 bytes 920. While any acceptable method may be used for this scrambling, a standard SONET scrambling polynomial is preferably used for the scrambling pattern.

While it may be preferable to rearrange incoming data streams to allow for errorless switching, depending on the amount of time required for various elements of router 300 to reacquire lock, such rearrangement of the incoming data stream is not strictly necessary. In fact, if switching and resynchronization can be performed quickly enough, no rearrangement whatever need be performed. This may depend not only on the speed with which the hardware is capable of re-acquiring lock, but on the amount of contiguous unused data at the beginning of a frame available for use in the switching operation, due either to the underlying protocol employed or the transmission of a special frame that allows for such switching. Thus, given a sufficient period of time (a sufficient number of unused bit times) at the beginning of a frame, no arrangement may be needed to perform errorless switching according to embodiments of the present invention.

Alternatively, the signal paths of a system such as router 300 may be operated at a speed higher than that of the incoming data stream. In such a case, more byte positions will exist per unit time than exist bytes from the incoming data stream. In such a scenario, a number of system-defined bytes would be inserted before the bytes from the incoming data stream are received. Among other possible uses of these system-defined bytes would be the possibility of provided relocking bytes (e.g., relock bytes 910) which could be corrupted (as they might be during the switching of a switching matrix such as switching matrix 330) without deleterious effects on the "live" data channels carried over the incoming data stream. These relocking bytes would also serve to support fast re-acquisition of lock by the CDRs within the system.

Figures 10, 10B:
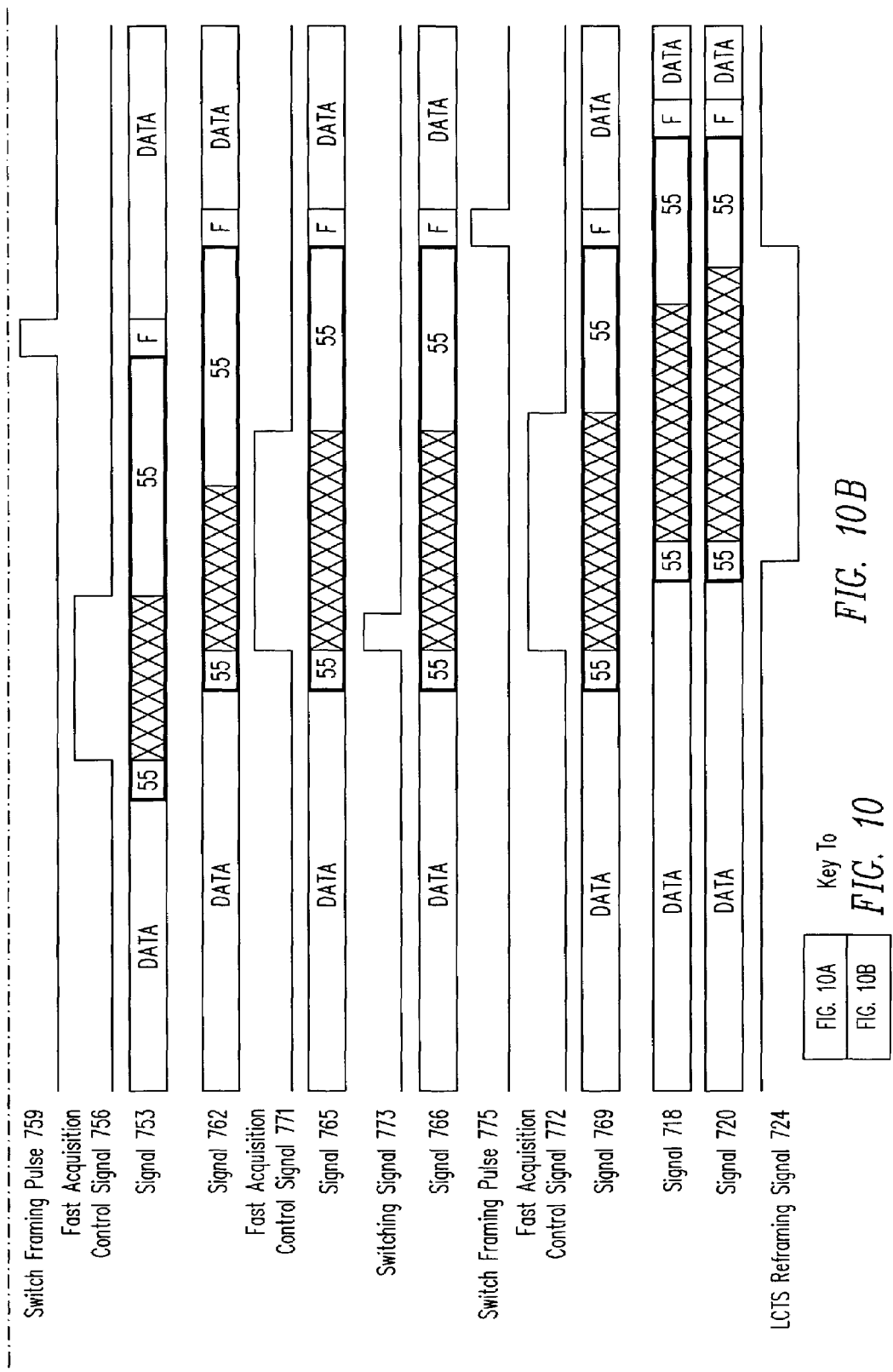
FIGS. 10A and 10B, referred to subsequently as FIG. 10, illustrate the various control and data signals of the errorless rearrangement path of FIGS. 7A and 7B.
Figure 10A:
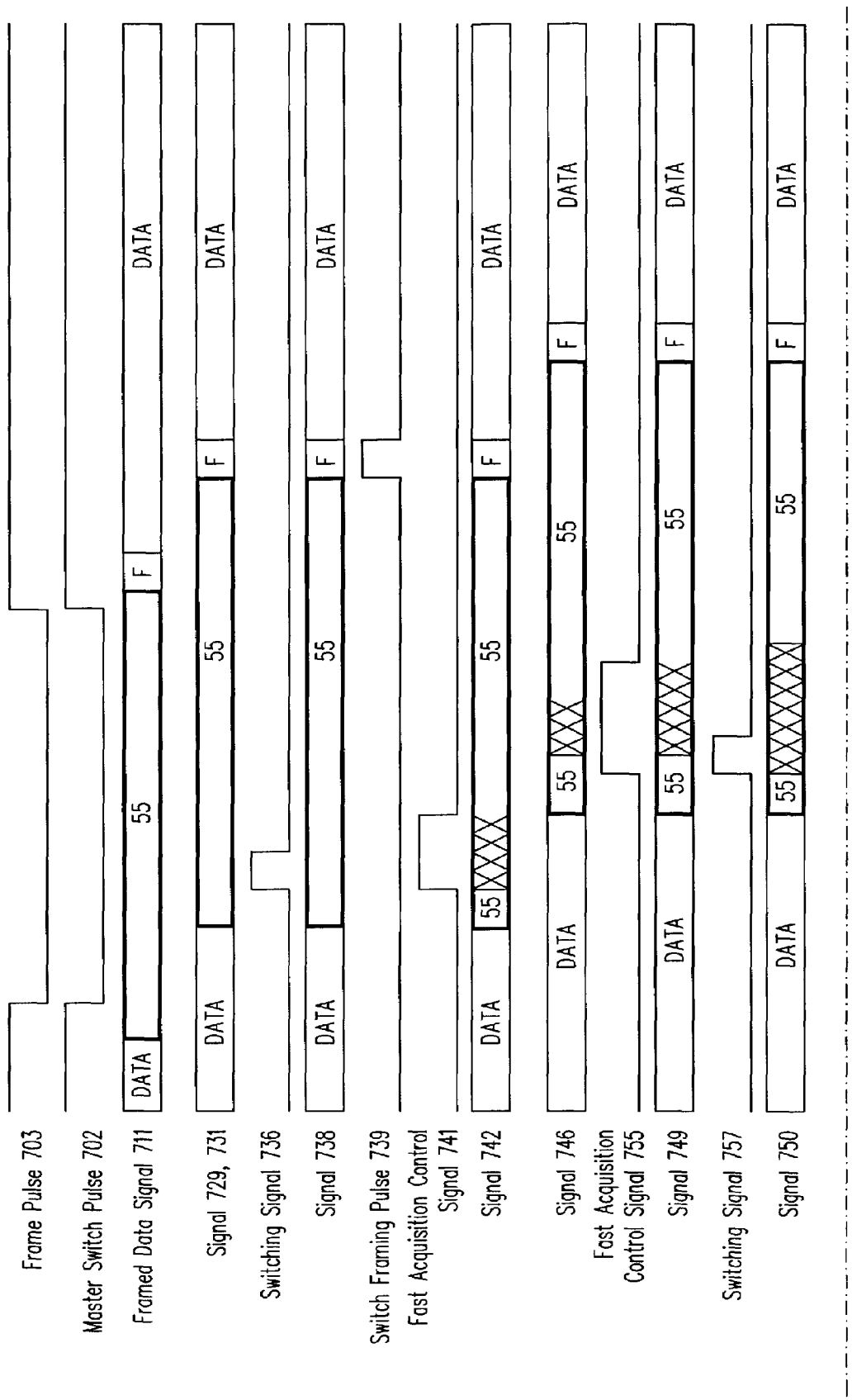

FIG. 10 illustrates the various control and data signals of FIG. 7. The data signals shown on all lines show several elements of the data signals. The portion of the signal marked "DATA" is valid transported data that must not be disturbed by the errorless rearrangement operation. The portion of the signal marked "55" is a relocking pattern of zeroes and ones of fixed duration in the frame and is used to assist in the fast relocking of the various CDRs throughout the datapath of router 300. The portion marked "F" indicates the start of frame mark for the data frame. The portion of the relocking signal marked "XXX" indicates that period of time when the CDRs are not locked to the incoming serial data frame.

In one embodiment, the relocking pattern in the frame is a fixed duration of 8448 bit times. The entire errorless rearrangement function must be accomplished in the 8448 bit times of the relocking pattern to avoid any loss of data. The signals are grouped into the five major blocks that make up the errorless rearrangement path (line card receive sections (LCRS 708), the three matrix stages (matrix stages 725, 726, and 727), and line card transmit sections (LCTS 709)). The data delay introduced by the cabling is shown in the data path signals shown in the diagram, and appears as the skewing of the data/relocking pattern.

The fast acquisition control signals within each matrix stage are asserted into their respective CDRs prior to the given CDR's inputs becoming unknown are held for a period of time necessary for the CDR to perform a fast relock function. The fast acquisition control signals should be sequenced carefully to track the location of the "55" portion of the data frame and the state of the signal coming into each respective CDR.

The operations performed in initializing the errorless switching aspects of router 300 are described in patent application Ser. No. 09/477,166, previously included by reference herein.

Figure 11B:
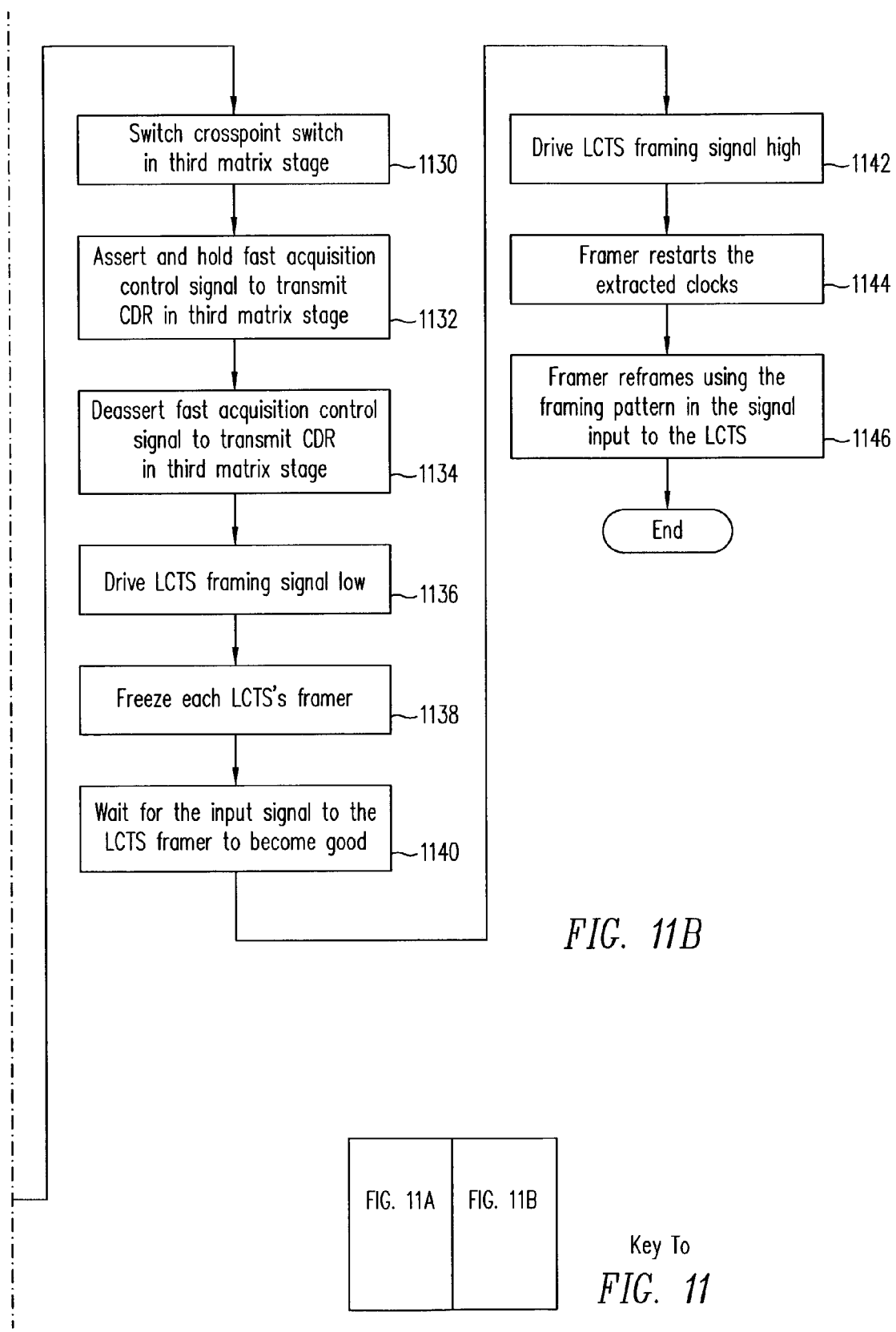
FIGS. 11A and 11B, referred to subsequently as FIG. 11, illustrate the actions taken in performing an errorless switching operation.
Figure 11A:
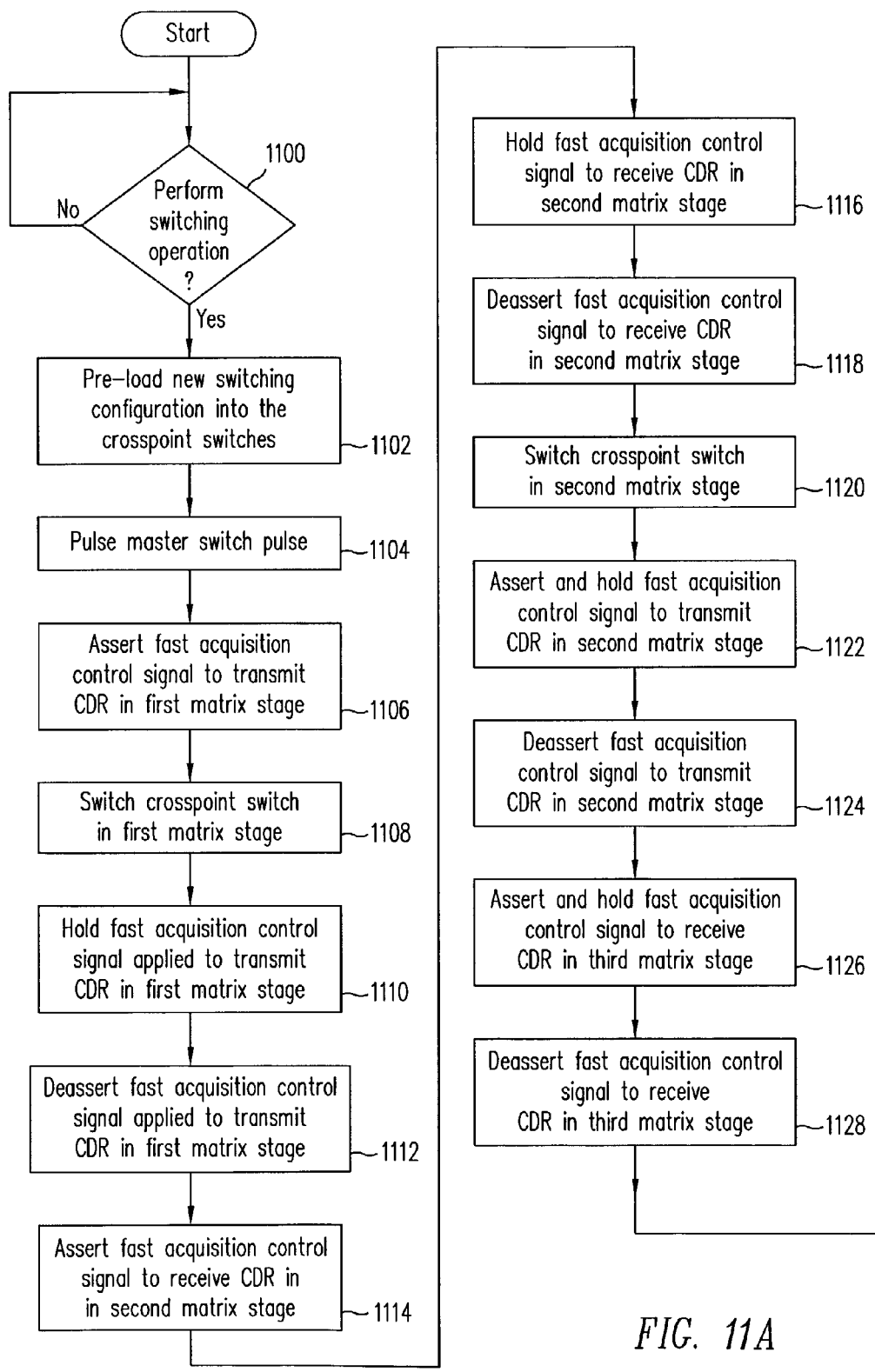

FIG. 11 illustrates the actions taken after initialization, in performing a switching operation. The actions discussed with regard to FIG. 11 are illustrated by the waveforms depicted in FIG. 10, unless otherwise noted in the description of the given action. Once the system is initialized, switching of the incoming signals may then be performed, as desired. It will be noted that an exemplary value of 200 bit times is used in determining the time required for lock hold/acquisition times. This value is merely used to facilitate explanation of the operation of router 300, and could be any value acceptable for the given framing/synchronization technology employed. This value would, in fact, be expected to drop with the advent of higher-speed technologies in the future. The errorless rearrangement sequence is performed as follows:

1. The process begins when a global processing element (not shown) determines that an errorless switch rearrangement operation is required (step 1100) (not shown in FIG. 10).
2. The new switch configuration is preloaded into each of the three switch elements (crosspoint switches 732, 748 and 764) (step 1102) (not shown in FIG. 10). The new switch configuration information is stored in crosspoint switches 732, 748, and 764, but is not actually applied to the switches until the crosspoint switches are instructed to do so by master switch pulse 702. The loading of the new configuration information is therefore not time critical.

3. The global processing element issues a pulse on master switch pulse 702 (step 1104). In one embodiment, master switch pulse 702 need only be pulsed once to perform the entire errorless rearrangement operation.

4. Fast acquisition control signal 741 is asserted to indicate to transmit CDR 740 that a phase change will occur on its input data signal (signal 738) (step 1106). Fast acquisition control signal 741 is asserted at the point at which the relocking pattern becomes present on signal 738, as determined by the location of the framing pulse on switch framing pulse 739.

5. A pulse on switching signal 736 is applied to crosspoint switch 732 indicating that crosspoint switch 732 should apply the new switch configuration loaded previously (step 1108). Data output on signal 738 then undergoes a phase change.

6. Fast acquisition control signal 741 signal is held for a fixed period of time (e.g., 200 bit times), but in any case for a time sufficient for transmit CDR 740 to relock to the phase change on signal 738 (step 1110).

7. Fast acquisition control signal 741 signal is deasserted (step 1112). Signal 742 is now locked to signal 738.

8. Fast acquisition control signal 755 is asserted to receive CDR 747, indicating to receive CDR 747 that a phase change will occur on its input data signal (signal 746) (step 1114). Fast acquisition control signal 755 is asserted at the point at which the relocking pattern becomes present on signal 746, as determined by the location of the framing pulse on switch framing pulse 759.

9. Fast acquisition control signal 755 is held for a fixed period of time (e.g., 400 bit times (200 bit times for relock of transmit CDR 740 and 200 bit times for relock of receive CDR 747)), but in any case for a time sufficient for receive CDR 747 to begin receiving good data and to relock to the phase change on signal 746 (step 1116).

10. Fast acquisition control signal 755 is deasserted (step 1118). Signal 749 is now locked to signal 746 by this operation.

11. A pulse on switching signal 757 is applied to crosspoint switch 748 indicating that crosspoint switch 748 should apply the new switch configuration loaded previously (step 1120). Signal 750 then undergoes a phase change.

12. Fast acquisition control signal 756 is asserted to transmit CDR 751 and is held for a fixed period of time (e.g., 600 bit times (200 bit times each for transmit CDR 740 and receive CDR 747 relock, and 200 bit times for transmit CDR 751 relock)), but in any case for a time sufficient for transmit CDR 751 to begin receiving good data and to relock to the phase change on signal 750 (step 1122).

13. Fast acquisition control signal 756 is deasserted (step 1124). Signal 753 is now locked to signal 750 by this operation.

14. Fast acquisition control signal 771 signal asserted to receive CDR 763 and is held for a fixed period of time (e.g., 800 bit times (200 bit times for CT1, receive CDR 747 and transmit CDR 751 relock and 200 bit times for receive CDR 763 relock)), but in any case for a time sufficient for receive CDR 763 to begin receiving good data and to relock to the phase change on signal 762 (step 1126).

15. Fast acquisition control signal 771 signal is deasserted (step 1128). Signal 765 is now locked to signal 762 by this operation.

16. A pulse on switching signal 773 is applied to crosspoint switch 764 indicating that crosspoint switch 764 should apply the new switch configuration loaded previously (step 1130). Signal 766 then undergoes a phase change.

17. Fast acquisition control signal 772 is asserted to transmit CDR 767 and is held for a fixed period of time (e.g., 1000 bit times (200 bit times relock of transmit CDR 740, receive CDR 747, transmit CDR 751, and receive CDR 763 and 200 bit times for relock of transmit CDR 767)) necessary for transmit CDR 767 to begin receiving good data and to relock to the phase change on signal 766 (step 1132).

18. Fast acquisition control signal 772 is deasserted (step 1134). Signal 767 is now locked to signal 766 by this operation.

19. LCTS reframing signal 724 is driven low at the appearance of the relocking pattern on signal 718 (step 1136). The clock recovered from signal 720 is ignored at framer 721.

20. Framer 721 is held in a frozen state during the period of time that signal 720 is unknown (step 1138).

21. Signal 720 becomes good a period of time (e.g. 1250 bit times) after signal 717 becomes known good (step 1140).

22. LCTS reframing signal 724 signal is driven high at end of the relocking pattern on signal 720 (step 1142).

23. Framer 721 restarts the clocks extracted from signal 720 (step 1144).

24. Framer 721 reframes on the framing pattern of signal 720 (e.g., "F") and begins passing data, completing the operation (step 1146).

Exemplary components of a protocol processor that supports the errorless rearrangement functions described herein, as well as the actions performed by such a protocol processor when performing an errorless rearrangement within a router such as router 300, are described in patent application Ser. No. 09/477,166, previously included by reference herein.

Implementation of the Present Invention in a Router

The inventors discovered that configurations of router 100 such as described in the foregoing sections were amenable to the implementation of embodiments of the present invention. The pointer processing and framing performed in the line cards of router 100 lent themselves to being used to adjust for the mesochronous characteristics of the incoming data streams.

As noted, each line card takes in one or more data streams, sends that data stream across matrix 130, and receives that or another data stream from matrix 130. Pointer processing of the transmit section on each line card's inbound side (the transmit section of the line card that transmits the ESF across matrix 130) can be configured to adjust the position of the payload in the ESF, while clock detection/data recovery throughout the rest of the system can be configured to perform fast framing (also referred to as fast acquisition). By adjusting the pointers of the inbound ESF (and so accounting for the position of the payload therein), router 100 is able to account for differences in phase and frequency (e.g., mesochronicity) in the incoming data streams. However, this alters the position of the transition between A1 bytes and A2 bytes within the ESF. In effect, the information in the given ESF (e.g., overhead information, data payloads and so on) is shifted within the ESF, with a given number of the 24 A1 bytes of A1/A2 bytes 920 being consumed in the process.

While this would normally cause frames to be dropped (due to the reduced number of A1 bytes and resulting change in the position of the A1/A2 transition), clock/data recovery units configured to perform fast framing accept such "abnormal" frames, and so allow the payload in a given ESF to "float" by a small amount. As a result, the inventors found that the amount that each payload could be shifted is limited by the number of bytes in the ESF by which the payload can be shifted (in either direction). In the ESF described herein, for example, the maximum amount of bytes that the payload can be shifted (given that a minimum number of relock bytes remain available for that purpose) is the number of "surplus" A1 bytes (the total number of A1 bytes less the minimum number required for the fast framing operation) plus the remaining number of unused relock bytes. Thus, unused relock bytes (in the ESF described herein) can be consumed in addition to the surplus A1 bytes.

This limit on the number of "consumable" bytes limits the rate at which such adjustments can be made. For example, considering only the surplus A1 bytes and assuming that four A1 bytes are needed to perform fast framing (and so there are 20 bytes (A1 bytes) that can be used), adjustments can be made at a maximum rate of:

$$\text{Rate} = 8 * \text{number\_bytes\_shifted} * \text{frames\_per\_second}$$
$$= 8 * 20 * 8000 \text{ bps}$$
$$= 1.28 \text{ Mbps}$$

for an STS-48 data stream.

The above example is for a data rate (of the data stream that is internal to router 100) that is nominally the same as that of the incoming data stream. As noted, however, the internal data rate of router 100 may be higher than that of the incoming data stream. Such a modification allows greater latitude in any discrepancies that may exist between an incoming data stream and the router's system clock, as well as between incoming data streams. This results from there being more "room" (a larger number of bit positions) in the ESF in which the bits of its payload may float.

It should also be noted that router 100 can be configured to allow for positive and negative adjustments. In such a scenario, a given amount of negative adjustment can be added to all ESF's, thereby setting a nominal A1/A2 transition at some mid-point, for example. In the preceding example, router 100 could be operated with a negative adjustment of 10 bytes for all ESF's, and so allow positive and negative adjustments of 10 bytes, respectively. As will be apparent to one of skill in the art, in this example, the rate at which adjustments can be made is halved in comparison to the scenario in which the entire adjustment amount is available for one type of adjustment or the other.

It will be noted that the H bytes in ESF 900 (H1 bytes 940, H2 bytes 950 and H3 bytes 960) still point to their respective payloads and H4 bytes 970 still provide their byte stuffing/payload function. It will also be noted that, preferably, the only component that moves relative to the frame is the payload—relative to the frame, the overhead does not move. The pointers simply point to the start of the payload within the frame, so if the payload moves within the frame, the pointer changes to point to the correct location of the start of payload.

Stuff bytes may or may not be used, depending on the situation. If no stuff bytes are needed, the H4 byte can be used as payload.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of errorlessly adjusting frame timing comprising:
   adjusting a position of information within a frame to produce an adjusted frame, wherein said adjusting
   comprises shifting a frame boundary of said frame in accord with a value related to a difference between a system clock signal and a frame timing signal associated with said frame and
   is performed by an ingress framing unit;
   framing said adjusted frame in relation to a data transition within said adjusted frame, wherein said framing is performed by an egress framing unit coupled to said ingress framing unit; and
   controlling said ingress framing unit to generate said adjusted frame and said egress framing unit to accept a frame timing of said adjusted frame, wherein said controlling is performed by a framing control unit coupled to said ingress framing unit and to said egress framing unit.

2. The method of claim 1, wherein said adjusting and said framing results in an amount of timing adjustment.

3. The method of claim 2, further comprising:
   if said amount of timing adjustment is insufficient, repeating said adjusting and said framing to achieve a total amount of timing adjustment.

4. The method of claim 2, wherein said amount of timing adjustment is one of a positive timing adjustment and a negative timing adjustment.

5. The method of claim 2, wherein said amount of timing adjustment is equal to a number of bytes by which said information is shifted multiplied by a period of said adjusted frame, divided by a number of bytes in said adjusted frame.

6. The method of claim 1, wherein said framing comprises:
   locking on a frame boundary of said adjusted frame.

7. The method of claim 1, wherein said adjusting and said framing prevent a loss-of-synchronous-frame-alignment error.

8. The method of claim 1, wherein
   said frame is one of a plurality of frames,
   said adjusting and said framing are performed on said frames, and
   said framing does not result in the generation of an error for any of said frames.

9. The method of claim 1, wherein said adjusting preserves a payload data of said frame.

10. A frame timing adjustment apparatus comprising:
    an ingress framing unit configured to receive a frame comprising information, and to generate an adjusted frame by virtue of being configured to adjust a position of said information within said frame, wherein said ingress framing unit is configured to shift a frame boundary of said frame in accord with a value related to a difference between a system clock signal associated with said frame timing apparatus and a frame timing signal associated with said frame;

an egress framing unit, coupled to said ingress framing unit and configured to accept a frame timing of said adjusted frame, and frame said adjusted frame in relation to a data transition within said adjusted frame; and a framing control unit, coupled to said ingress framing unit and to said egress framing unit, and configured to control said ingress framing unit to generate said adjusted frame and said egress framing unit to accept a frame timing of said adjusted frame.

11. The apparatus of claim 10, wherein said ingress framing unit comprises:

a pointer processor configured to process pointer information of said frame, wherein said pointer information of said frame indicates said position of said information within said frame, and said processing adjusts said position of said information within said frame.

12. The apparatus of claim 11, wherein said pointer processor comprises:

an extended buffer.

13. The apparatus of claim 12, wherein said extended buffer is configured to support an underflow of a first magnitude and an overflow of a second magnitude.

14. The apparatus of claim 10, wherein said egress framing unit comprises:

a pointer processor configured to process pointer information of said adjusted frame, wherein said pointer information of said adjusted frame indicates a position of said information within said adjusted frame, and said processing accepts said position of said information within said adjusted frame.

15. The apparatus of claim 14, wherein said pointer processor comprises:

an extended buffer.

16. The apparatus of claim 15, wherein said extended buffer is configured to support an underflow of a first magnitude and an overflow of a second magnitude.

17. The apparatus of claim 10, wherein said framing control unit is configured to receive a master frame synchronization signal, said master frame synchronization signal indicating proper frame synchronization for said frame and said adjusted frame.

18. The apparatus of claim 10, wherein said ingress framing unit is configured to preserve a payload data of said frame.

19. In a system comprising an ingress framing unit, an egress framing unit coupled to said ingress framing unit and a framing control unit coupled to said ingress framing unit and to said egress framing unit, a computer-readable storage medium storing processor-executable instructions comprising:

a first subset of instructions, executable by said ingress framing unit, configured to adjust a position of information within a frame to produce an adjusted frame, wherein said first subset of instructions is configured to shift a frame boundary of said frame in accord with a value related to a difference between a system clock signal and a frame timing signal associated with said frame;

a second subset of instructions, executable by said egress framing unit, configured to frame said adjusted frame in relation to a data transition within said adjusted frame; and a third subset of instructions, executable by said framing control unit, configured to control said ingress framing unit to produce said adjusted frame and said egress framing unit to accept a timing of said adjusted frame.

20. The computer-readable storage medium of claim 19, wherein execution of said first subset of instructions and said second set of instructions result in an amount of timing adjustment.

21. The computer-readable storage medium of claim 20, said processor-executable instructions further comprising:

a fourth subset of instructions, executable by said ingress framing unit and said egress framing unit, configured to repeat execution of said first subset of instructions and said second set of instructions to achieve a total amount of timing adjustment, if said amount of timing adjustment is insufficient.

22. The computer-readable storage medium of claim 20, wherein said amount of timing adjustment is one of a positive timing adjustment and a negative timing adjustment.

23. The computer-readable storage medium of claim 20, wherein said amount of timing adjustment is equal to a number of bytes by which said information is shifted multiplied by a period of said adjusted frame, divided by a number of bytes in said adjusted frame.

24. The computer-readable storage medium of claim 19, wherein said second subset of instructions comprises:

a first subsubset of instructions, executable by said egress framing unit, configured to lock on a frame boundary of said adjusted frame.

25. The computer-readable storage medium of claim 19, wherein execution of said first and said second subsets of instructions prevent a loss-of-synchronous-frame-alignment error.

26. The computer-readable storage medium of claim 19, wherein:

said frame is one of a plurality of frames, said first and said second subsets of instructions are performed for each of said frames, and said second subset of instructions does not result in the generation of an error for any of said frames.

27. The computer-readable storage medium of claim 19, wherein said first subset of instructions is configured to preserve a payload data of said frame.

28. An apparatus for errorlessly adjusting frame timing comprising:

means for adjusting a position of information within a frame to produce an adjusted frame, wherein said means for adjusting comprises means for shifting a frame boundary of said frame in accord with a value related to a difference between a system clock signal associated with said apparatus and a frame timing signal associated with said frame;

means for framing said adjusted frame in relation to a data transition within said adjusted frame, wherein said means for framing is coupled to said means for adjusting; and means for controlling said means for adjusting to produce said adjusted frame and said means for framing to accept a frame timing of said adjusted frame, wherein said means for controlling is coupled to said means for adjusting and means for framing.

29. The apparatus of claim 28, wherein said means for adjusting and said means for framing generate an amount of timing adjustment.

30. The apparatus of claim 29, wherein said amount of timing adjustment is one of a positive timing adjustment and a negative timing adjustment.

31. The apparatus of claim 29, wherein said amount of timing adjustment is equal to a number of bytes by which said information is shifted multiplied by a period of said adjusted frame, divided by a number of bytes in said adjusted frame.

32. The apparatus of claim 28, wherein said means for framing comprises:
   means for locking on a frame boundary of said adjusted frame.

33. The apparatus of claim 28, wherein the operation of said means for adjusting and said means for framing prevent a loss-of-synchronous-frame-alignment error.

34. The apparatus of claim 28, wherein
   said frame is one of a plurality of frames,
   said means for adjusting and said means for framing operate on said frames,
   said means for framing does not cause the generation of an error for any of said frames.

35. The apparatus of claim 28, wherein said means for adjusting is configured to preserve a payload data of said frame.

* * * * *